(12) United States Patent
Ishikawa et al.

(10) Patent No.: US 12,713,384 B2
(45) Date of Patent: Aug. 18, 2026

(54) COMMUNICATION APPARATUS AND COMMUNICATION METHOD

(71) Applicant: TOSHIBA TEC KABUSHIKI KAISHA, Tokyo (JP)

(72) Inventors: Hiroyuki Ishikawa, Sunto Shizuoka (JP); Sadatoshi Oishi, Fuji Shizuoka (JP); Koki Nakamura, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 300 days.

(21) Appl. No.: 18/534,770

(22) Filed: Dec. 11, 2023

(65) Prior Publication Data

US 2024/0357539 A1 Oct. 24, 2024

(30) Foreign Application Priority Data

Apr. 3, 2023 (JP) ................................ 2023-060216

(51) Int. Cl.

*H04W 64/00* (2009.01)
*H04B 17/318* (2015.01)
*H04W 24/02* (2009.01)
*H04W 24/10* (2009.01)

(52) U.S. Cl.

CPC .......... *H04W 64/00* (2013.01); *H04B 17/318* (2015.01); *H04W 24/02* (2013.01); *H04W 24/10* (2013.01)

(58) Field of Classification Search

CPC ..... H04W 64/00; H04W 24/02; H04W 24/10; H04B 17/318

See application file for complete search history.

(56) References Cited

U.S. PATENT DOCUMENTS 9,704,002 B2 * 7/2017 Nikitin ............... G06K 7/10108
10,586,082 B1 * 3/2020 Tang ..................... G06N 20/00

FOREIGN PATENT DOCUMENTS

| | | |
|---|---|---|
| JP | 2010-139325 | 6/2010 |
| JP | 2011-186751 | 9/2011 |
| JP | 2013-246057 | 12/2013 |
| WO | 2017/043482 | 3/2017 |

* cited by examiner

*Primary Examiner* — Tuan H Nguyen

(74) *Attorney, Agent, or Firm* — Amin, Turocy & Watson, LLP

(57) ABSTRACT

A communication apparatus includes a first determination processing unit that determines, based on measurement of a target including one or more wireless tags by a measurement unit, an arrangement of the target with respect to a predetermined range. A movement control unit controls movement of an antenna. An acquisition unit acquires, based on a radio wave of each of the wireless tags received by the antenna, a plurality of pieces of tag data on the wireless tag at a plurality of relative positions of the antenna. A second determination processing unit determines, based on data output from a trained model in response to input of the plurality of pieces of tag data on the wireless tag to the trained model, a positional relationship of the wireless tag with respect to the predetermined range, the trained model being selected from a plurality of trained models.

20 Claims, 11 Drawing Sheets

| | POSITION (mm) | 0 | a | 2a | ... | L−2a | L−a | L |
|---|---|---|---|---|---|---|---|---|
| WIRELESS TAG A | PHASE (°) | | | | | | | |
| | DOPPLER FREQUENCY | | | | | | | |
| | RSSI | | | | | | | |
| WIRELESS TAG B | PHASE (°) | | | | | | | |
| | DOPPLER FREQUENCY | | | | | | | |
| | RSSI | | | | | | | |
| ... | ... | | | | | | | |

(A)

(B)

(C)

START

ACQUIRE TRAINING DATA — ACT21

GENERATE TRAINED MODEL — ACT22

STORE — ACT23

END

COMMUNICATION APPARATUS AND COMMUNICATION METHOD

CROSS-REFERENCE TO RELATED APPLICATION

This application is based upon and claims the benefit of priority from Japanese Patent Application No. 2023-060216, filed on Apr. 3, 2023, the entire contents of which are incorporated herein by reference.

FIELD

Embodiments described herein relate generally to a communication apparatus and a communication method.

BACKGROUND

There is an apparatus that determines, when an antenna receives a radio wave transmitted from a wireless tag attached to an article, a range in which the wireless tag is included. Such an apparatus moves the antenna to detect a phase of the wireless tag. The apparatus determines the range in which the wireless tag is included based on an aspect of the detected phase. For example, if the wireless tag is placed within a predetermined range, the apparatus can determine that the wireless tag is within the predetermined range based on the aspect of the detected phase.

Here, if a person attempts to place an article attached with a wireless tag or a container containing the article to the predetermined range, the article or the container may protrude from the predetermined range. If the article or the container protrudes from the predetermined range, the wireless tag attached to the article may protrude from the predetermined range. An aspect of a phase detected for the wireless tag may be more similar to an aspect of a phase in another range different from the predetermined range than an aspect of a phase in the predetermined range, depending on a position of the wireless tag. In such a case, the apparatus determines that the wireless tag is within the other range. However, since the wireless tag is originally to be placed in the predetermined range, it is not preferable to determine that the wireless tag is within the other range.

DESCRIPTION OF THE DRAWINGS

FIG. 1 illustrates a block diagram of an example of a configuration of a communication system according to an embodiment.

FIG. 3 illustrates an example of a data structure of measurement data.

DETAILED DESCRIPTION

Figure 2:
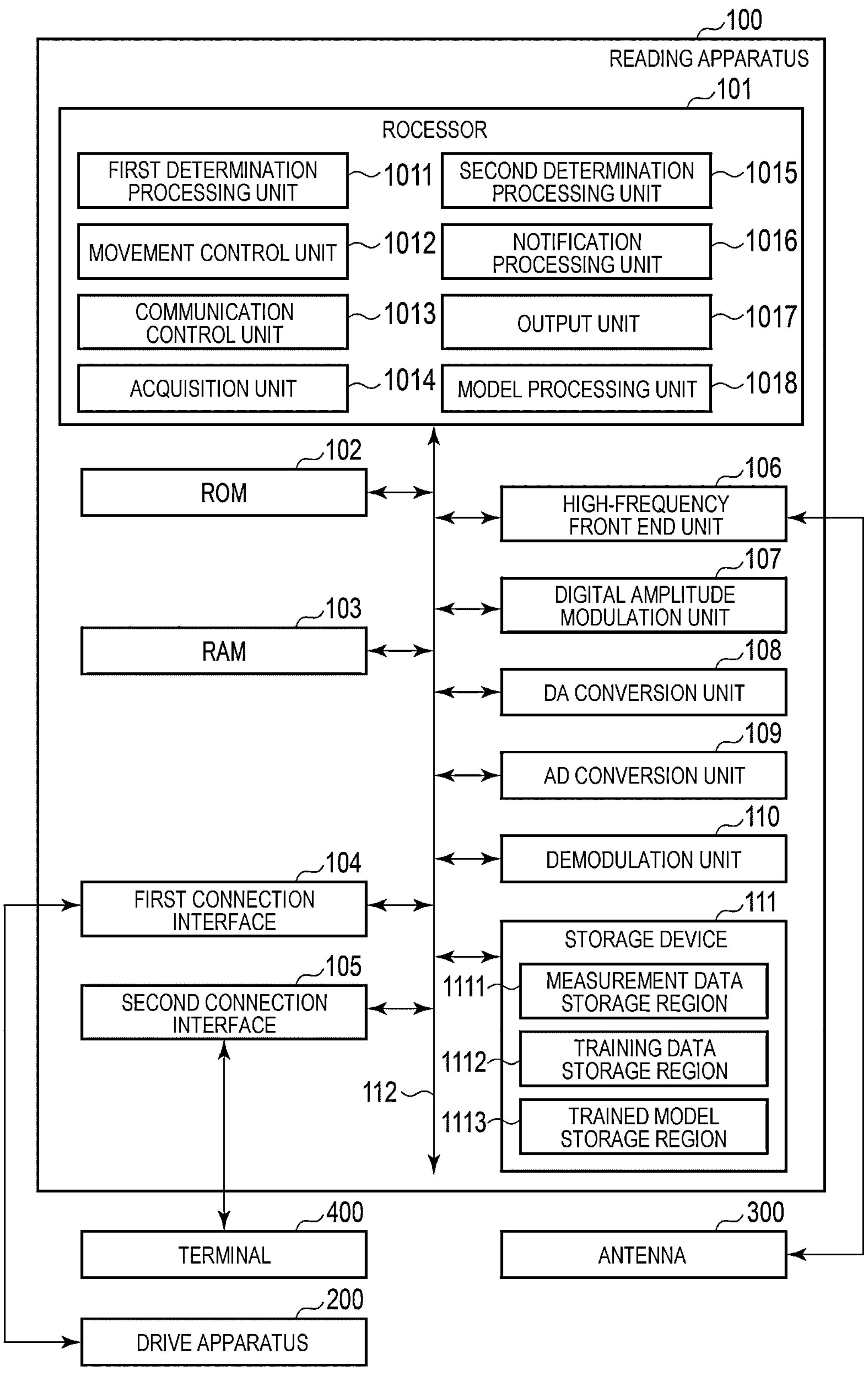
FIG. 2 illustrates a block diagram of an example of a configuration of a reading apparatus.

An embodiment provides a technique for improving the determination accuracy of a positional relationship of a wireless tag with respect to a predetermined range.

According to one embodiment, a communication apparatus includes a first determination processing unit, a movement control unit, an acquisition unit, and a second determination processing unit. The first determination processing unit determines, based on measurement of a target including one or more wireless tags by a measurement unit, an arrangement of the target with respect to a predetermined range. The movement control unit controls movement of a relative position of an antenna with respect to the target. The acquisition unit acquires, based on a radio wave of each of the wireless tags received by the antenna, a plurality of pieces of tag data on the wireless tag at a plurality of relative positions of the antenna. The second determination processing unit determines, based on data output from a trained model in response to input of the plurality of pieces of tag data on the wireless tag to the trained model, a positional relationship of the wireless tag with respect to the predetermined range, the trained model being selected from a plurality of trained models according to the arrangement of the target.

Embodiment

Hereinafter, a communication system according to an embodiment will be described with reference to the drawings. In the drawings to be used in the following description of the embodiment, a scale of each part may be appropriately changed. The drawings used in the description of the following embodiment may show a configuration in an omitted manner for the sake of description.

Configuration Example

Figure 1:
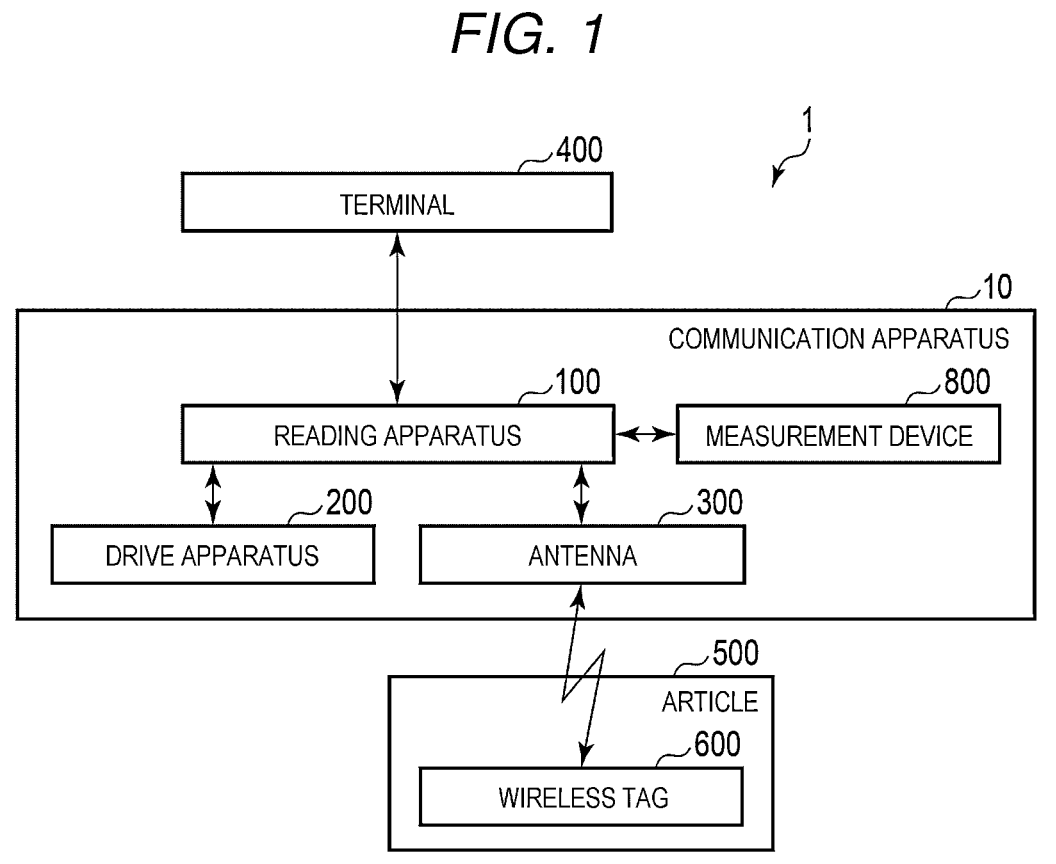

FIG. 1 illustrates a block diagram of an example of a configuration of a communication system 1.

The communication system 1 includes a communication apparatus 10, a terminal 400, and one or more wireless tags 600 attached to one or more articles 500. FIG. 1 illustrates one wireless tag 600 attached to one article 500, but the communication system 1 may include a plurality of wireless tags 600 attached to a plurality of articles 500. The communication system 1 includes the communication apparatus 10 and the terminal 400 and may not include the one or more articles 500. The communication system 1 is an example of an information processing system.

The communication apparatus 10 is an apparatus that wirelessly communicates with the wireless tag 600. The communication apparatus 10 may be applied to inspection or the like in a warehouse, may be used in a store, and application examples of the communication apparatus 10 are not limited thereto. The communication apparatus 10 includes a reading apparatus 100, a drive apparatus 200, an antenna 300, and a measurement device 800.

The reading apparatus 100 is an apparatus that controls the drive apparatus 200 and the antenna 300 to read information from the wireless tag 600. The reading apparatus 100 is also an apparatus that controls the drive apparatus 200 and the antenna 300 to detect tag data on the wireless tag 600. The detection includes meaning of measurement. A configuration example of the reading apparatus 100 will be described later.

The tag data is data detected in time series based on a radio wave of the wireless tag 600 received by the reading apparatus 100. The radio wave of the wireless tag 600 is a radio wave transmitted from the wireless tag 600. The radio wave of the wireless tag 600 may be referred to as a radio wave from the wireless tag 600. The tag data includes at least one of phase data, Doppler frequency data, and received signal strength indicator (RSSI) data. The phase data is data indicating a phase of the radio wave of the wireless tag 600 received by the reading apparatus 100. The Doppler frequency data is data indicating a frequency of the radio wave of the wireless tag 600 received by the reading apparatus 100. The RSSI data is data indicating an RSSI of the radio wave of the wireless tag 600 received by the reading apparatus 100. The RSSI indicates reception strength. The reception strength is also referred to as radio wave reception strength or reception signal strength.

The drive apparatus 200 is an apparatus that moves the antenna 300. Moving the antenna 300 includes moving a position of the antenna 300. Moving the antenna 300 is an example of moving a relative position of the antenna 300 with respect to the wireless tag 600. The position of the antenna 300 is an example of the relative position of the antenna 300 with respect to the wireless tag 600. A configuration example of the drive apparatus 200 will be described later.

The antenna 300 communicates with the wireless tag 600. The antenna 300 transmits a radio wave. The antenna 300 receives the radio wave of the wireless tag 600. The radio wave of the wireless tag 600 is an example of a response wave from the wireless tag 600 in response to the radio wave transmitted from the antenna 300. The antenna 300 converts the received radio wave into a high-frequency signal and outputs the high-frequency signal to the reading apparatus 100.

The measurement device 800 is a device that measures a measurement target in order to determine an arrangement of the measurement target with respect to a first range. The measurement target is a target including one or more wireless tags 600 to be measured by the measurement device 800. The article 500 attached with the one or more wireless tags 600 included in the measurement target is an article required to be treated as a processing target in the communication system 1. The measurement target may be the article 500 attached with the one or more wireless tags 600. The measurement target may be a container containing the article 500 attached with the one or more wireless tags 600. For example, the container is, but is not limited to, a basket. The arrangement of the measurement target with respect to the first range includes that the measurement target is within the first range or that the measurement target is not within the first range. The measurement target being within the first range means that the entire measurement target is within the first range. The measurement target being not within the first range means that a part of the measurement target is within the first range and a remaining part of the measurement target is not within the first range. For example, the remaining part of the measurement target being not within the first range means that the remaining part of the measurement target is outside the first range and outside a second range. If the measurement target is not within the first range, the arrangement of the measurement target with respect to the first range may include an aspect in which the measurement target protrudes from the first range. The aspect in which the measurement target protrudes from the first range may include at least one of a position where, a direction where, and an amount by which the measurement target protrudes from the first range. The arrangement of the measurement target with respect to the first range is also referred to as a positional orientation of the measurement target with respect to the first range. The measurement device 800 may be a non-contact device that measures the measurement target in a non-contact manner or may be a contact device that measures the measurement target while being in contact with the measurement target. The measurement device 800 is an example of a measurement unit.

The measurement device 800 may be a camera. In this example, the camera captures an image of the first range and the vicinity of the first range. The camera is an example of the non-contact device.

The measurement device 800 may be an optical sensor that detects light. In this example, the first range is set on an upper surface side of a counter table 700 to be described later. The counter table 700 is made of a material through which light can be transmitted. Lighting illuminates the upper surface of the counter table 700 from above. The optical sensor is installed on a bottom surface side of the counter table 700 at a position facing the first range and the vicinity of the first range with the counter table 700 interposed therebetween. The optical sensor detects weak light at a portion facing the measurement target on the counter table 700. The optical sensor detects strong light at a portion not facing the measurement target on the counter table 700. The optical sensor is an example of the non-contact device.

The measurement device 800 may be a sensor that detects a container. In one example, the sensor is a Hall sensor. In this example, the first range is set on the upper surface side of the counter table 700 to be described later. The Hall sensor is installed on the bottom surface side of the counter table 700 at a position facing the first range and the vicinity of the first range with the counter table 700 interposed therebetween. A magnet is attached to the container. The Hall sensor detects a magnetic field at a portion facing the magnet attached to the container on the counter table 700. The Hall sensor is an example of the non-contact device.

In another example, the sensor is an electrostatic capacitance sensor. In this example, the first range is set on the upper surface side of the counter table 700 to be described later. The electrostatic capacitance sensor is provided on the upper surface side of the counter table 700 in the first range and in the vicinity of the first range. The electrostatic capacitance sensor detects a change in electrostatic capacitance at a portion in contact with the container. The electrostatic capacitance sensor is an example of the contact device.

The terminal 400 is an apparatus that processes information. The terminal 400 may be a personal computer (PC) or a dedicated apparatus. The terminal 400 is not limited thereto as long as the terminal 400 is an apparatus that processes information. FIG. 1 illustrates one terminal 400, but the communication system 1 may include a plurality of terminals 400. The terminal 400 is an example of an information processing terminal. A configuration example of the terminal 400 will be described later.

The article 500 is a commodity or the like.

The wireless tag 600 is a determination target wireless tag whose positional relationship with respect to the first range is to be determined. For example, the positional relationship of the wireless tag 600 with respect to the first range is that the wireless tag 600 is within the first range or the wireless tag 600 is within a second range. The first range and the second range are different ranges that do not overlap each other. For example, the first range and the second range are three-dimensional ranges. The second range is not adjacent to the first range. The range includes meaning of a region. The first range is an example of a predetermined range. Examples of the first range and the second range will be described later. The wireless tag 600 may be a wireless tag within the first range or a wireless tag within the second range.

The determination of the positional relationship of the wireless tag 600 with respect to the first range includes determining which range of the first range and the second range the wireless tag 600 is within. Determining which range of the first range and the second range the wireless tag 600 is within includes determining that the wireless tag 600 is within the first range or the second range. The wireless tag 600 being within the first range includes that the wireless tag 600 is present within the first range. The wireless tag 600 being within the first range may include regarding the wireless tag 600 as being within the first range. The wireless tag 600 being within the second range includes that the wireless tag 600 is present within the second range. The wireless tag 600 being within the second range may include regarding the wireless tag 600 as being within the second range. The article 500 attached with the wireless tag 600 determined to be within the first range is an article to be treated as a processing target in the communication system 1. The article 500 attached with the wireless tag 600 determined to be within the second range is an article not to be treated as the processing target in the communication system 1.

The wireless tag 600 is an IC tag including an IC chip and an antenna. The wireless tag 600 is typically a radio frequency identification (RFID) tag. The wireless tag 600 may be another IC tag. The wireless tag 600 is a passive type wireless tag that operates using the radio wave transmitted from the antenna 300 as an energy source. By performing backscatter modulation on a non-modulated signal, the wireless tag 600 transmits, through the antenna, a signal including information stored in the IC chip of the wireless tag 600. The information stored in the wireless tag 600 may include identification information that can be uniquely identified. For example, the identification information stored in the wireless tag 600 is an electronic product code (EPC) number. The EPC number includes a unique identification code and a serial number related to the article 500. Hereinafter, the identification information stored in the wireless tag 600 may be abbreviated as "identification information". The identification information is an example of information on the wireless tag 600.

The reading apparatus 100 will be described with reference to FIG. 2.

FIG. 2 illustrates a block diagram of an example of a configuration of the reading apparatus 100.

The reading apparatus 100 includes a processor 101, a read-only memory (ROM) 102, a random-access memory (RAM) 103, a first connection interface 104, a second connection interface 105, a high-frequency front end unit 106, a digital amplitude modulation unit 107, a digital-to-analog (DA) conversion unit 108, an analog-to-digital (AD) conversion unit 109, a demodulation unit 110, and a storage device 111. The units provided in the reading apparatus 100 are connected by a bus 112 or the like.

The processor 101 corresponds to a central part of a computer that performs processing such as calculation and control necessary for an operation of the reading apparatus 100. The processor 101 loads various programs stored in the ROM 102 or the storage device 111 onto the RAM 103. The programs are programs for causing the processor 101 to execute various processes. The processor 101 executes the programs loaded onto the RAM 103 to implement respective units to be described later and execute various processes.

The processor 101 is a central processing unit (CPU), a micro-processing unit (MPU), a system-on-a-chip (SoC), a digital signal processor (DSP), a graphics processing unit (GPU), an application-specific integrated circuit (ASIC), a programmable logic device (PLD), a field-programmable gate array (FPGA), or the like. The processor 101 may be a combination of a plurality of these units described above. The processor 101 is an example of a processing circuit.

The ROM 102 corresponds to a main memory apparatus of the computer including the processor 101 as the center. The ROM 102 is a non-volatile memory used exclusively for reading data. The ROM 102 stores the above-described programs. The ROM 102 stores data or various setting values used when the processor 101 performs various processes.

The RAM 103 corresponds to a main memory apparatus of the computer including the processor 101 as the center. The RAM 103 is a memory used for reading and writing data. The RAM 103 is a work area for storing data used temporarily when the processor 101 performs various processes.

The first connection interface 104 is an interface for the reading apparatus 100 to communicate with the drive apparatus 200.

The second connection interface 105 is an interface for the reading apparatus 100 to communicate with the terminal 400.

The high-frequency front end unit 106 outputs a high-frequency signal to the antenna 300. The high-frequency front end unit 106 receives a high-frequency signal from the antenna 300.

The digital amplitude modulation unit 107 is a circuit that adds data to be transmitted to the wireless tag 600 to a carrier wave to be transmitted to the wireless tag 600.

The DA conversion unit 108 is a circuit that converts a digital signal into an analog signal. The DA conversion unit 108 converts a digital signal modulated by the digital amplitude modulation unit 107 into an analog signal. The DA conversion unit 108 outputs a high-frequency signal to the antenna 300 via the high-frequency front end unit 106.

The AD conversion unit 109 is a circuit that converts an analog signal into a digital signal. The AD conversion unit 109 converts the high-frequency signal received via the high-frequency front end unit 106 from the antenna 300 into a digital signal.

The demodulation unit 110 is a circuit that acquires information based on the radio wave of the wireless tag 600 received by the antenna 300. For example, based on a known technique, the demodulation unit 110 acquires, from the digital signal converted by the AD conversion unit 109, the identification information stored in the wireless tag 600. The demodulation unit 110 is an example of an information acquisition unit that acquires the identification information stored in the wireless tag 600 based on the received radio wave of the wireless tag 600.

The demodulation unit 110 is also a circuit that detects the tag data in time series based on the radio wave of the wireless tag 600 received by the antenna 300. Based on a known technique, the demodulation unit 110 can detect, from the digital signal converted by the AD conversion unit 109, the phase data in time series. Based on a known technique, the demodulation unit 110 can detect, from the digital signal converted by the AD conversion unit 109, the Doppler frequency data in time series. Based on a known technique, the demodulation unit 110 can detect, from the digital signal converted by the AD conversion unit 109, the RSSI data in time series. The demodulation unit 110 is an example of a detection unit that detects the tag data based on the radio wave of the wireless tag 600 received by the antenna 300.

The storage device 111 is an apparatus implemented by a non-volatile memory that stores data, a program, and the like. The storage device 111 is, but is not limited to, a hard disk drive (HDD) or a solid-state drive (SSD). The storage device 111 is an example of a storage unit.

The storage device 111 includes a measurement data storage region 1111.

The measurement data storage region 1111 stores measurement data.

The measurement data includes a tag data set for each wireless tag 600. The tag data set includes a plurality of pieces of tag data at a plurality of positions of the antenna 300. The tag data is detected by the demodulation unit 110 according to movement of the antenna 300 moved by the drive apparatus 200 along one direction. For example, the one direction is a horizontal direction. The tag data set includes a plurality of pieces of position data on the antenna 300. The plurality of pieces of position data on the antenna 300 are data indicating a plurality of positions of the antenna 300. The plurality of positions of the antenna 300 are a plurality of positions based on the movement of the antenna 300. The plurality of pieces of tag data are associated with the plurality of pieces of position data on the antenna 300, respectively. Hereinafter, the plurality of pieces of tag data at the plurality of positions of the antenna 300 may be referred to as a "plurality of pieces of tag data". Hereinafter, a mode in which the antenna 300 moves along the one direction will be described as an example, but the movement mode of the antenna 300 is not limited thereto. The movement mode of the antenna 300 may be various modes such as rotating and moving along a circumferential direction.

The plurality of positions of the antenna 300 may include positions at a regular interval from a position 0 corresponding to a home position to a position L. It is assumed that a range from the position 0 to the position L is a movement range of the antenna 300 that moves along the one direction. The movement range of the antenna 300 is an example of a movement range of the relative position of the antenna 300 with respect to the wireless tag 600. The position 0 is an example of a first point. The position L is an example of a second point. A value of the regular interval can be set as appropriate. The position L can be set as appropriate. The demodulation unit 110 may detect, based on the wireless tag 600, the tag data for all of the positions at the regular interval from the position 0 to the position L. The demodulation unit 110 may not detect, based on the wireless tag 600, the tag data only at a part of the positions at the regular interval from the position 0 to the position L. The measurement data may be updated. A configuration example of the measurement data will be described later.

An example in which the storage device 111 stores the measurement data is described, but the configuration is not limited thereto. The RAM 103 may store the measurement data. In this case, the RAM 103 is an example of the storage unit.

The storage device 111 includes a training data storage region 1112.

The training data storage region 1112 stores a plurality of pieces of different training data corresponding to an arrangement of a training target with respect to the first range. The training data is data used for machine learning. The training data includes a plurality of training tag data sets on a plurality of training wireless tags. The plurality of training wireless tags include one or more training wireless tags included in the training target. The training target may be an article attached with the one or more training wireless tags. The training target may be a container containing the article attached with the one or more training wireless tags. The training wireless tag is an example of a wireless tag implemented similarly to the wireless tag 600.

The arrangement of the training target with respect to the first range includes that the training target is within the first range or that the training target is not within the first range. The training target being within the first range means that the entire training target is within the first range. The training target being not within the first range means that a part of the training target is within the first range and a remaining part of the training target is not within the first range. For example, the remaining part of the training target being not within the first range means that the remaining part of the training target is outside the first range and outside the second range. If the training target is not within the first range, the arrangement of the training target with respect to the first range may include an aspect in which the training target protrudes from the first range. The aspect in which the training target protrudes from the first range may include at least one of a position where, a direction where, and an amount by which the training target protrudes from the first range.

The plurality of pieces of training data include training data indicating that the training target is within the first range. The plurality of pieces of training data include a plurality of pieces of training data indicating that the training target is not within the first range. The plurality of pieces of training data indicating that the training target is not within the first range are a plurality of different pieces of data corresponding to the aspect in which the training target protrudes from the first range.

The training tag data set is an example of a tag data set including a plurality of pieces of training tag data at a plurality of positions of an antenna. The plurality of positions of the antenna are each an example of a relative position of the antenna with respect to the training wireless tag. The training tag data is an example of tag data on the training wireless tag. The training tag data is detected based on a radio wave of the training wireless tag received by a reading apparatus via the antenna according to movement of the antenna moved by a drive apparatus along one direction. For example, the one direction is the horizontal direction. Moving the antenna is an example of moving the relative position of the antenna with respect to the training wireless tag. The training tag data includes at least one of training phase data, training Doppler frequency data, and training RSSI data. The training tag data set includes a plurality of pieces of position data of the antenna. The plurality of pieces of position data of the antenna are data indicating a plurality of positions of the antenna. The plurality of positions of the antenna are a plurality of positions based on the movement of the antenna. The plurality of pieces of training tag data are associated with the plurality of pieces of position data of the antenna, respectively. A movement mode of the antenna is not limited to a mode in which the antenna moves along the one direction. The movement mode of the antenna may be various modes such as rotating and moving along a circumferential direction.

The training wireless tag may be a wireless tag within the first range or a wireless tag in the second range. If the training target is within the first range, the one or more training wireless tags included in the training target are wireless tags within the first range. If the training target is not within the first range, the one or more training wireless tags included in the training target may be wireless tags within the first range or may be wireless tags not within the first range. For example, a wireless tag that is not within the first range is a wireless tag that is outside the first range and outside the second range. The plurality of training tag data sets related to the plurality of training wireless tags are examples of a plurality of pieces of training tag data on a plurality of training wireless tags.

The reading apparatus may be the same reading apparatus as the reading apparatus 100 or may be a reading apparatus different from the reading apparatus 100. The antenna may be the same antenna as the antenna 300 or may be an antenna different from the antenna 300. The drive apparatus may be the same drive apparatus as the drive apparatus 200 or may be a drive apparatus different from the drive apparatus 200.

The training data includes a plurality of pieces of ground truth data. The plurality of pieces of ground truth data are a plurality of pieces of data indicating a positional relationship of the plurality of training wireless tags with respect to the first range. The ground truth data is data indicating the positional relationship of the training wireless tag with respect to the first range for each training wireless tag. The positional relationship of the training wireless tag with respect to the first range is that the training wireless tag is within the first range or the training wireless tag is within the second range. The training wireless tag being within the first range includes that the training wireless tag is present within the first range. The training wireless tag being within the first range may include regarding the training wireless tag as being within the first range. The training wireless tag being within the second range includes that the training wireless tag is present within the second range. The training wireless tag being within the second range may include regarding the training wireless tag as being within the second range.

The plurality of pieces of ground truth data for the training wireless tag within the first range include ground truth data indicating that the training wireless tag is within the first range. The plurality of pieces of ground truth data for the training wireless tag within the second range include ground truth data indicating that the training wireless tag is within the second range. The plurality of pieces of ground truth data include ground truth data for the one or more training wireless tags included in the training target indicating that the one or more training wireless tags are within the first range. That is, regardless of whether the one or more training wireless tags included in the training target are within the first range, the ground truth data indicates that the training wireless tags are within the first range. Therefore, the one or more training wireless tags included in the training target are regarded as being within the first range regardless of whether the training wireless tags are actually within the first range. The ground truth data is data input by a user. The training data may be updated.

The storage device 111 includes a trained model storage region 1113.

The trained model storage region 1113 stores a plurality of trained models. The plurality of trained models are models generated by the machine learning based on the plurality of pieces of training data. The plurality of trained models are a plurality of different models corresponding to the arrangement of the training target with respect to the first range, and notation of "generation" includes not only an aspect of newly creating but also an aspect of updating. The plurality of trained models are associated with information indicating the arrangement of the training target with respect to the first range.

The trained model is used to determine the positional relationship of the wireless tag 600 with respect to the first range. The trained model outputs determination output data for each wireless tag 600 based on input of determination input data. The determination input data includes a plurality of pieces of tag data at a plurality of positions of the antenna 300. The determination output data is data indicating the positional relationship of the wireless tag 600 with respect to the first range. For example, the determination output data is data indicating that the wireless tag 600 is within the first range or data indicating that the wireless tag 600 is within the second range.

The bus 112 includes a control bus, an address bus, a data bus, and the like. The bus 112 transmits a signal to be exchanged between the units of the reading apparatus 100.

The hardware configuration of the reading apparatus 100 is not limited to the above-described configuration. In the reading apparatus 100, the above-described constituent elements may be appropriately omitted and changed, and a new constituent element may be added thereto.

Each unit implemented by the processor 101 will be described.

The processor 101 implements a first determination processing unit 1011, a movement control unit 1012, a communication control unit 1013, an acquisition unit 1014, a second determination processing unit 1015, a notification processing unit 1016, an output unit 1017, and a model processing unit 1018. Each unit implemented by the processor 101 can also be referred to as each function. Each unit implemented by the processor 101 may be implemented by a control unit including the processor 101, the ROM 102, and the RAM 103.

The first determination processing unit 1011 determines, based on measurement of the measurement target by the measurement device 800, the arrangement of the measurement target with respect to the first range. Determining the arrangement of the measurement target with respect to the first range includes determining whether the measurement target is within the first range. Determining whether the measurement target is within the first range includes determining that the measurement target is within the first range or that the measurement target is not within the first range. Determining the arrangement of the measurement target with respect to the first range includes determining an aspect in which the measurement target protrudes from the first range if the measurement target is not within the first range. Determining the arrangement of the measurement target with respect to the first range may include determining that at least a part of the measurement target is within the first range or that the entire measurement target is not within the first range. At least a part of the measurement target being within the first range includes the entire measurement target being within the first range and a part of the measurement target being within the first range while a remaining part of the measurement target being not within the first range.

The movement control unit 1012 controls the movement of the antenna 300 along the one direction by controlling the drive apparatus 200.

The communication control unit 1013 controls start and end of transmission of the radio wave from the antenna 300.

The acquisition unit 1014 acquires the tag data for each wireless tag 600 based on the radio wave of the wireless tag 600 received by the antenna 300.

The second determination processing unit 1015 selects, based on the arrangement of the measurement target with respect to the first range determined by the first determination processing unit 1011, one trained model from the plurality of trained models. The second determination processing unit 1015 determines, based on the plurality of pieces of tag data on the wireless tag 600, the positional relationship of the wireless tag 600 with respect to the first range.

If the first determination processing unit 1011 determines that the entire measurement target is not within the first range, the notification processing unit 1016 processes a notification. The notification is a notification related to the fact that the entire measurement target is not within the first range. For example, the notification is a notification that prompts repositioning such that at least a part of the measurement target is within the first range. An output mode of the notification may be output by display or output by sound.

The output unit 1017 outputs a determination result to the terminal 400. The determination result is for the wireless tag 600 whose positional relationship with respect to the first range is determined by the second determination processing unit 1015. The determination result includes data indicating the positional relationship of the wireless tag 600 with respect to the first range determined by the second determination processing unit 1015. For example, the determination result includes data indicating that the wireless tag 600 is within the first range or data indicating that the wireless tag 600 is within the second range. The determination result is associated with the identification information.

The model processing unit 1018 generates the trained model.

FIG. 3 illustrates an example of a data structure of the measurement data.

The measurement data includes a tag data set for each wireless tag 600. The tag data set includes a plurality of pieces of tag data at a plurality of positions of the antenna 300. The tag data set includes tag data associated with a part or all of positions at a regular interval a between the position 0 and the position L. The tag data set may include tag data associated with each position different from the positions at the regular interval a between the position 0 and the position L.

The tag data set may include a plurality of pieces of phase data at a plurality of positions of the antenna 300. A phase value changes as the position of the antenna 300 changes. This is because a distance between the antenna 300 and the wireless tag 600 changes as the antenna 300 moves. Since the phase value depends on the distance between the antenna 300 and the wireless tag 600, distribution of the plurality of pieces of phase data differs depending on a position of the wireless tag 600.

The tag data set may include a plurality of pieces of Doppler frequency data at a plurality of positions of the antenna 300. A Doppler frequency value changes as the position of the antenna 300 changes. This is because the Doppler frequency value is different between a case where the antenna 300 approaches the wireless tag 600 and a case where the antenna 300 is away from the wireless tag 600. Distribution of the plurality of pieces of Doppler frequency data differs depending on the position of the wireless tag 600.

The tag data set may include a plurality of pieces of RSSI data at a plurality of positions of the antenna 300. An RSSI value changes as the position of the antenna 300 changes. This is because the distance between the antenna 300 and the wireless tag 600 changes as the antenna 300 moves. Since the RSSI value depends on the distance between the antenna 300 and the wireless tag 600, distribution of the plurality of pieces of RSSI data differs depending on the position of the wireless tag 600.

The drive apparatus 200 will be described with reference to FIGS. 4 and 5.

Figure 4:
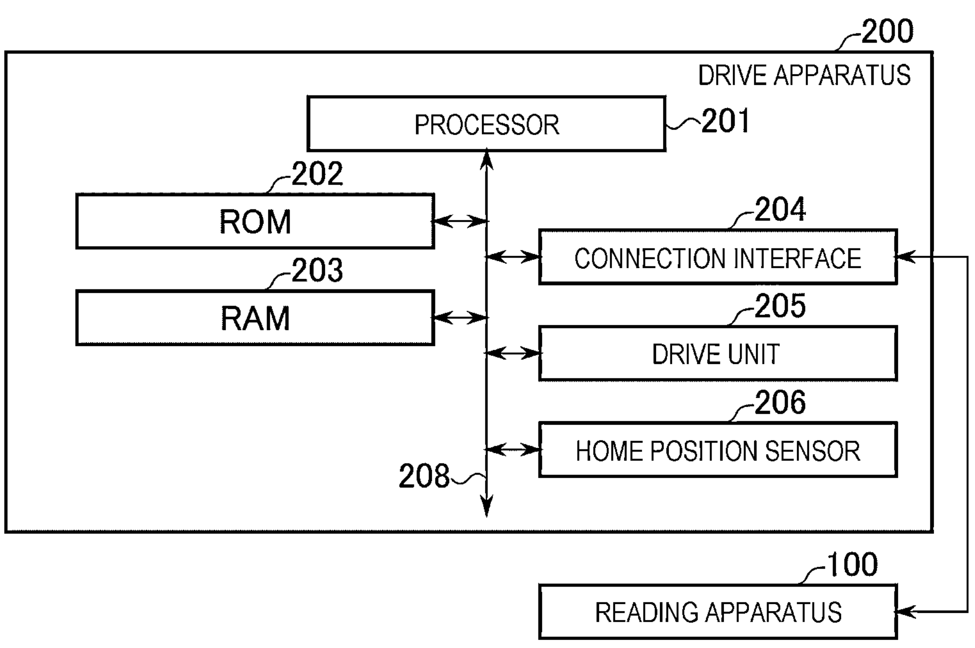
FIG. 4 illustrates a block diagram of an example of a configuration of a drive apparatus.

FIG. 4 illustrates a block diagram of an example of a configuration of the drive apparatus 200.

The drive apparatus 200 includes a processor 201, a ROM 202, a RAM 203, a connection interface 204, a drive unit 205, and a home position sensor 206. The units provided in the drive apparatus 200 are connected by a bus 208 or the like.

The processor 201 corresponds to a central part of a computer that performs processing such as calculation and control necessary for an operation of the drive apparatus 200. The processor 201 loads various programs stored in the ROM 202 or the like onto the RAM 203. The programs are programs for causing the processor 201 to execute various processes. The processor 201 executes the programs loaded onto the RAM 203 to execute various processes. The processor 201 is a CPU, MPU, SoC, DSP, GPU, ASIC, PLD, FPGA, or the like. The processor 201 may be a combination of a plurality of these units described above. The processor 201 is an example of a processing circuit.

The ROM 202 corresponds to a main memory apparatus of the computer including the processor 201 as the center. The ROM 202 is a non-volatile memory used exclusively for reading data. The ROM 202 stores the above-described programs. The ROM 202 stores data or various setting values used when the processor 201 performs various processes.

The RAM 203 corresponds to a main memory apparatus of the computer including the processor 201 as the center. The RAM 203 is a memory used for reading and writing data. The RAM 203 is a work area for storing data used temporarily when the processor 201 performs various processes.

The connection interface 204 is an interface for the drive apparatus 200 to communicate with the reading apparatus 100.

The drive unit 205 moves the antenna 300. For example, the drive unit 205 is a stepping motor.

The home position sensor 206 is a sensor that detects whether the antenna 300 is at a start point. If the drive unit 205 moves the antenna 300 from the first point to the second point, the start point is the first point, and an end point is the second point. If the drive unit 205 moves the antenna 300 from the second point to the first point, the start point is the second point, and the end point is the first point.

The bus 208 includes a control bus, an address bus, a data bus, and the like. The bus 208 transmits a signal to be exchanged between the units of the drive apparatus 200.

Figure 5:
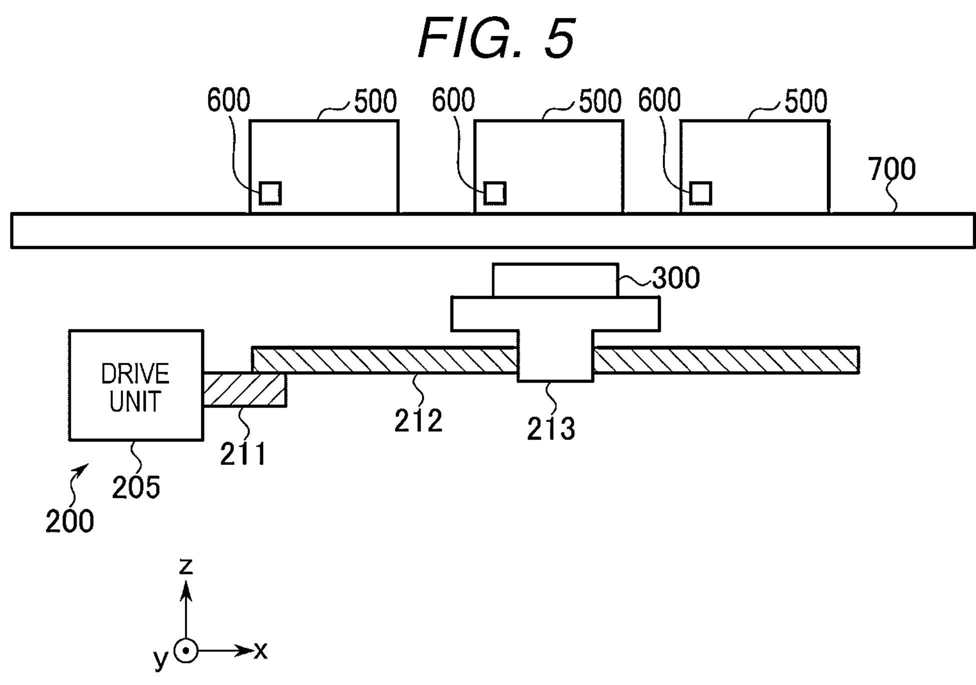
FIG. 5 illustrates a schematic diagram for explaining the drive apparatus.

FIG. 5 illustrates a schematic diagram for explaining the drive apparatus 200.

The drive apparatus 200 includes a rotation shaft 211, a rail 212, and a moving stage 213.

As illustrated in FIG. 5, the drive apparatus 200 and the antenna 300 are disposed below the counter table 700. The counter table 700 is a table having a horizontal surface on which the articles 500 each attached with the wireless tag 600 are placed. The counter table 700 is an example of a placement portion. The counter table 700 may be provided in the communication system 1 or the communication apparatus 10.

The rotation shaft 211 transmits a driving force of the drive unit 205. Screw grooves are formed in the rotation shaft 211 and the rail 212. The screw grooves are connected to face each other. Therefore, when the drive unit 205 is rotationally driven, the rotation shaft 211 rotates and the rail 212 rotates.

The rail 212 extends along the one direction. The moving stage 213 on which the antenna 300 is placed is attached to the rail 212.

The moving stage 213 includes a ball screw nut and moves in the one direction along the rail 212 when the rail 212 is rotated by the ball screw nut. That is, the moving stage 213 moves in the horizontal direction along an x-axis illustrated in FIG. 5. The moving stage 213 reciprocates along the one direction according to a rotation direction of the rail 212. Thus, the drive apparatus 200 reciprocates the antenna 300 in the one horizontal direction along the x-axis along the rail 212.

The hardware configuration of the drive apparatus 200 is not limited to the above-described configuration. In the drive apparatus 200, the above-described constituent elements may be appropriately omitted and changed, and a new constituent element may be added thereto. For example, the movement mode of the antenna 300 may be a mode in which the antenna 300 rotates and moves along the circumferential direction instead of the mode in which the antenna 300 moves along the one horizontal direction.

The first range and the second range will be described.

Figure 6:
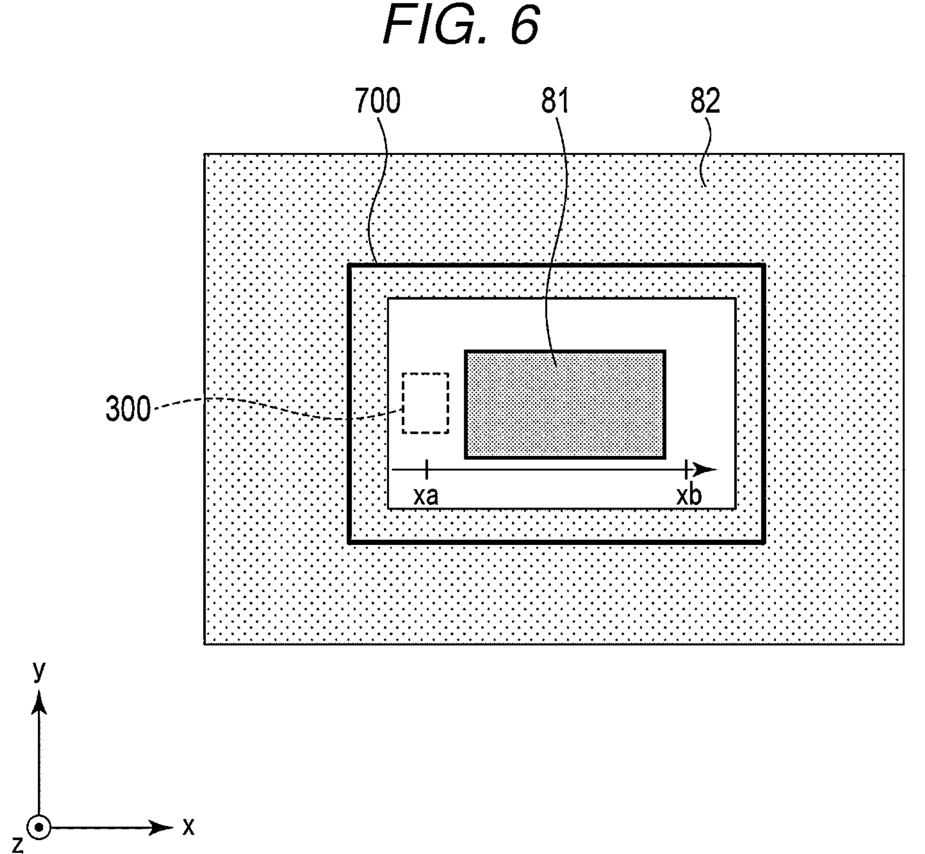
FIG. 6 illustrates a schematic diagram for explaining a first range and a second range.

FIG. 6 illustrates a schematic diagram for explaining a first range 81 and a second range 82, and is a plan view of the counter table 700 as viewed from above.

The first range 81 and the second range 82 are ranges separated in the horizontal direction. The first range 81 is a range set in a central portion of the horizontal surface of the counter table 700. The second range 82 is a range set in an outer peripheral portion of the horizontal surface of the counter table 700 and outside the counter table 700 in the horizontal direction. The second range 82 is set to be surrounded the first range 81. In FIG. 6, the second range 82 is set to be spaced apart from the first range 81 without being adjacent thereto.

Setting of the first range 81 and the second range 82 is not limited thereto. The first range 81 may be a range set in the central portion of the horizontal surface of the counter table 700. The second range 82 may be a range set in the outer peripheral portion of the horizontal surface of the counter table 700. The first range 81 may be a range set over the entire horizontal surface of the counter table 700. The second range 82 may be a range set outside the counter table 700 in the horizontal direction. The second range 82 is not limited to a range surrounding the first range 81.

A positional relationship between the first range and the movement range of the antenna 300 will be described with reference to FIG. 6. As will be exemplified below, the first range faces a part or all of the movement range of the antenna 300. The x-axis is a moving direction of the antenna 300. The moving direction of the antenna 300 is an example of a moving direction of the relative position of the antenna 300 with respect to the wireless tag 600. A z-axis is a direction orthogonal to the moving direction of the antenna 300. The movement range of the antenna 300 is between a first point xa and a second point xb along the x-axis. The first point xa is a position that does not face the first range along the z-axis, which is a position outside one end of the first range along the x-axis. The second point xb is a position that does not face the first range along the z-axis, which is a position outside the other end of the first range along the x-axis. The first range faces a part of the movement range of the antenna 300 along the z-axis. One of the first point xa and the second point xb may be a position that does not face the first range along the z-axis, and the other may be a position facing the first range along the z-axis. In this case, the first range faces a part of the movement range of the antenna 300 in the direction along the z-axis. The first point xa and the second point xb may both be positions facing the first range along the z-axis. In this case, the first range faces the entire movement range of the antenna 300 along the z-axis.

Figure 7:
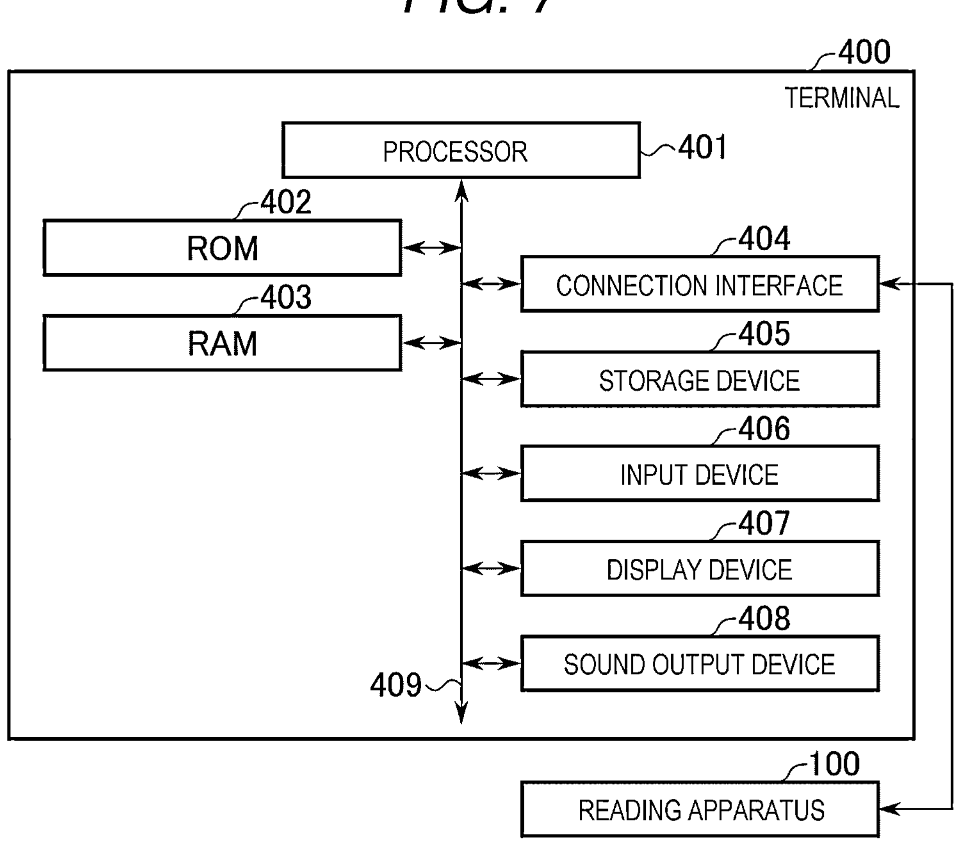
FIG. 7 illustrates a block diagram of an example of a configuration of a terminal.

FIG. 7 illustrates a block diagram of an example of a configuration of the terminal 400.

The terminal 400 includes a processor 401, a ROM 402, a RAM 403, a connection interface 404, a storage device 405, an input device 406, a display device 407, and a sound output device 408. The units provided in the terminal 400 are connected by a bus 409 or the like. A configuration of the processor 401 may be the same as the configuration of the processor 101. A configuration of the ROM 402 may be the same as the configuration of the ROM 102. A configuration of the RAM 403 may be the same as the configuration of the RAM 103. The connection interface 404 is an interface for the terminal 400 to communicate with the reading apparatus 100. A configuration of the storage device 405 may be the same as the configuration of the storage device 111.

The input device 406 is a device that enables an instruction to be input based on a user operation. The input device 406 may include a pressable button. The input device 406 may include a touch panel integrated with the display device 407.

The display device 407 is a device that can display various images. The display device 407 is, but is not limited to, a liquid crystal display or an organic electroluminescence (EL) display.

The sound output device 408 is a device that can output sound. The sound output device 408 is, but is not limited to, a speaker.

Operation Example

Processing in the communication system 1 will be described.

A processing procedure to be described below is merely an example, and each process may be changed if possible. Acts in the processing procedure to be described below can be omitted or replaced, or an act can be added thereto as appropriate according to embodiments.

A determination process performed by the processor 101 of the reading apparatus 100 will be described. The determination process is a process for the wireless tag 600 of determining the positional relationship of the wireless tag 600 with respect to the first range.

Figure 8:
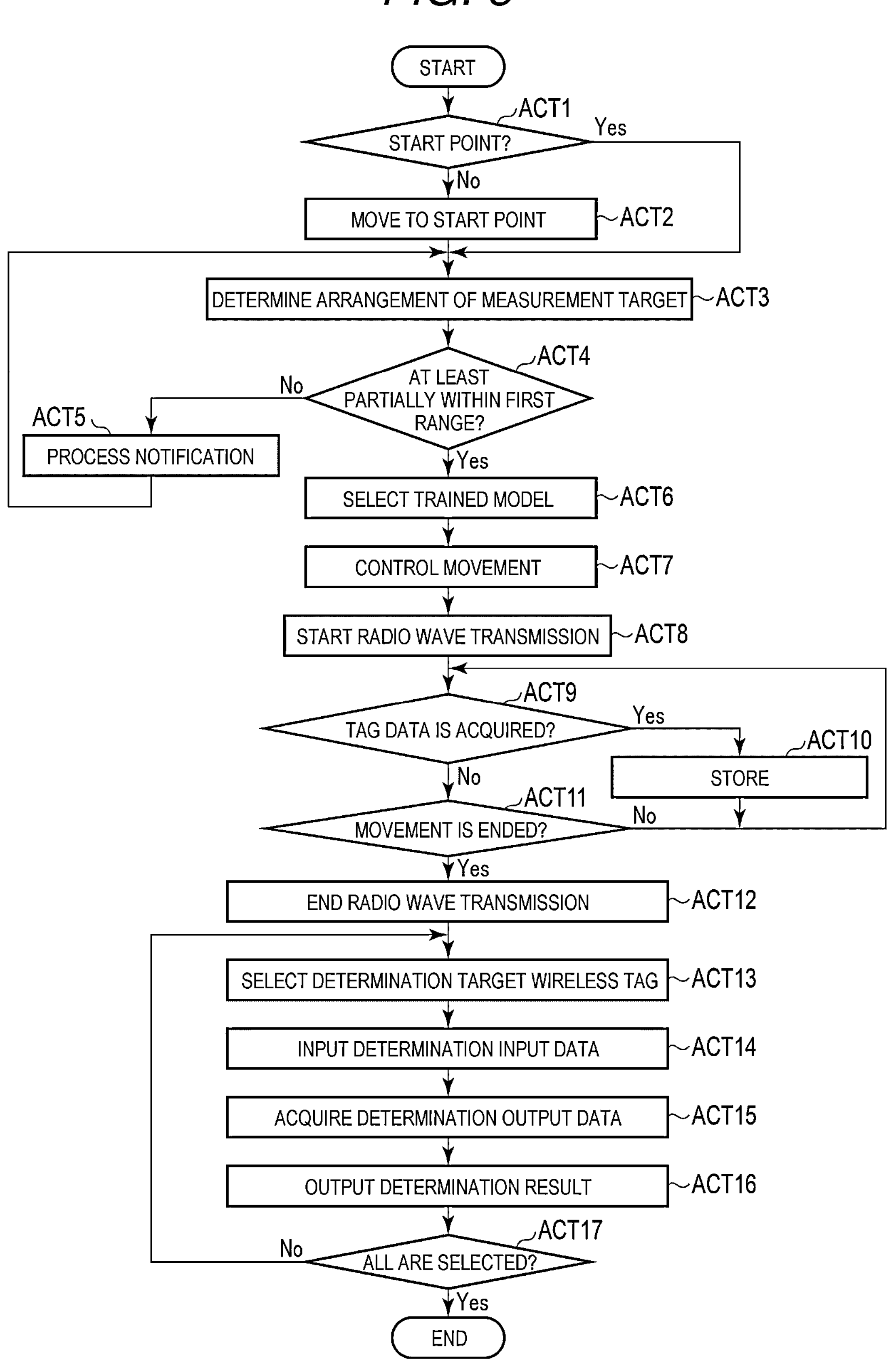
FIG. 8 illustrates a flowchart of an example of a determination process performed by a processor of the reading apparatus.

FIG. 8 illustrates a flowchart of an example of the determination process performed by the processor 101 of the reading apparatus 100.

For example, it is assumed that the measurement target is placed on the counter table 700. An article 500 that is not required to be treated as a processing target in the communication system 1 may be present in the second range.

The processor 101 of the reading apparatus 100 may start determination process based on acquisition of a the determination process start instruction input by the user through the terminal 400.

Here, it is assumed that the start point is the first point, and the end point is the second point. Therefore, the drive unit 205 moves the antenna 300 from the first point to the second point in the one direction.

The movement control unit 1012 determines whether the antenna 300 is located at the start point (ACT 1). If the antenna 300 is not located at the start point (ACT 1, NO), the process transitions from ACT 1 to ACT 2. If the antenna 300 is located at the start point (ACT 1, YES), the process transitions from ACT 1 to ACT 3.

The movement control unit 1012 controls the antenna 300 to move to the start point (ACT 2). In ACT 2, for example, the movement control unit 1012 transmits, to the drive apparatus 200, a move-to-start-point instruction. The move-to-start-point instruction is an instruction to move the antenna 300 to the start point. The processor 201 of the drive apparatus 200 receives, from the reading apparatus 100, the move-to-start-point instruction. The processor 201 controls the drive unit 205 to move the antenna 300 to the start point based on the move-to-start-point instruction. The drive unit 205 moves the antenna 300 to the start point under control of the processor 201.

The first determination processing unit 1011 determines, based on the measurement of the measurement target by the measurement device 800, the arrangement of the measurement target with respect to the first range (ACT 3). In ACT 3, for example, the first determination processing unit 1011 acquires a measurement result from the measurement device 800. The first determination processing unit 1011 detects a range of the measurement target based on the measurement result. For example, the range of the measurement target is a range on the counter table 700 on which the measurement target is placed. The range of the measurement result may be a two-dimensional range of a portion of the measurement target which is in contact with the counter table 700 or may be a three-dimensional range of the entire measurement target. The first determination processing unit 1011 compares the detected range of the measurement target with the first range set on the counter table 700. The first determination processing unit 1011 determines, based on the comparison, the arrangement of the measurement target with respect to the first range.

If the first determination processing unit 1011 determines that the entire measurement target is not within the first range (ACT 4, NO), the process transitions from ACT 4 to ACT 5. If the first determination processing unit 1011 determines that at least a part of the measurement target is within the first range (ACT 4, YES), the process transitions from ACT 4 to ACT 6.

The notification processing unit 1016 processes the notification (ACT 5). In ACT 5, for example, the notification processing unit 1016 outputs notification information to the terminal 400 via the second connection interface 105. The notification information is information for causing the terminal 400 to output the notification. The notification information may include information indicating contents of the notification. The processor 401 of the terminal 400 processes the output of the notification based on the notification information. The processor 401 may perform processing to display a notification image on the display device 407. The processor 401 may perform processing such that notification sound is output from the sound output device 408. If the reading apparatus 100 includes one or both of the display device and the sound output device, the notification processing unit 1016 may not output the notification information to the terminal 400. In this example, the notification processing unit 1016 may perform processing to display the notification image on the display device. The notification processing unit 1016 may perform processing such that the notification sound is output from the sound output device.

The second determination processing unit 1015 selects one trained model from the plurality of trained models based on the arrangement of the measurement target with respect to the first range (ACT 6). In ACT 6, for example, the second determination processing unit 1015 compares the arrangement of the measurement target with respect to the first range with information indicating the arrangement of the training target with respect to the first range related to the plurality of trained models. The second determination processing unit 1015 may search, based on the comparison, for the arrangement of the training target with respect to the first range most similar to the arrangement of the measurement target with respect to the first range. The second determination processing unit 1015 selects one trained model associated with the information indicating the searched arrangement of the training target with respect to the first range.

If the measurement target is within the first range, the second determination processing unit 1015 selects the trained model based on the training data in which the training target is within the first range. Accordingly, the second determination processing unit 1015 can determine that the wireless tags 600 are within the first range for the one or more wireless tags 600 included in the measurement target. If the measurement target is not within the first range, the second determination processing unit 1015 selects the trained model based on the training data corresponding to the aspect in which the training target protrudes from the first range. The aspect in which the training target protrudes from the first range is most similar to the aspect in which the measurement target protrudes from the first range. Accordingly, the second determination processing unit 1015 can determine that the wireless tags 600 are within the first range for the one or more wireless tags 600 included in the measurement target. That is, the second determination processing unit 1015 can determine that the wireless tags 600 are within the first range even if there is a wireless tag 600 that is not within the first range among the one or more wireless tags 600 included in the measurement target.

The movement control unit 1012 controls the movement of the antenna 300 (ACT 7). In ACT 7, for example, the movement control unit 1012 controls the antenna 300 to move from the start point to the end point along the one direction. The movement control unit 1012 transmits, to the drive apparatus 200, a move-to-end-point instruction. The move-to-end-point instruction is an instruction to move the antenna 300 from the start point to the end point. The processor 201 of the drive apparatus 200 receives, from the reading apparatus 100, the move-to-end-point instruction. The processor 201 controls the drive unit 205 to move the antenna 300 from the start point to the end point in the one direction based on the move-to-end-point instruction. The drive unit 205 moves the antenna 300 from the start point to the end point in the one direction under control of the processor 201.

The communication control unit 1013 controls start of radio wave transmission from the antenna 300 (ACT 8). In ACT 8, for example, the communication control unit 1013 controls the start of the radio wave transmission from the antenna 300 based on start of the movement of the antenna 300 from the start point. The communication control unit 1013 may control the start of the radio wave transmission from the antenna 300 based on a movement start notification from the drive apparatus 200. The movement start notification may indicate that the movement of the antenna 300 starts from the start point. The antenna 300 starts the radio wave transmission for reading the identification information stored in the wireless tag 600.

The acquisition unit 1014 acquires the tag data for each wireless tag 600 (ACT 9). In ACT 9, for example, the acquisition unit 1014 acquires the tag data detected by the demodulation unit 110 for each wireless tag 600. If the acquisition unit 1014 acquires the tag data (ACT 9, YES), the process transitions from ACT 9 to ACT 10. If the acquisition unit 1014 does not acquire the tag data (ACT 9, NO), the process transitions from ACT 9 to ACT 11.

Based on the acquisition of the tag data, the acquisition unit 1014 stores, in the measurement data storage region 1111, the tag data as data constituting the measurement data (ACT 10).

The communication control unit 1013 determines whether the movement of the antenna 300 ends (ACT 11). In ACT 11, for example, the communication control unit 1013 determines whether the movement of the antenna 300 from the start point to the end point ends. The communication control unit 1013 may determine that the movement of the antenna 300 ends based on a movement end notification from the drive apparatus 200. The movement end notification may indicate that the movement of the antenna 300 ends since the end point is reached. If the movement of the antenna 300 ends (ACT 11, YES), the process transitions from ACT 11 to ACT 12. If the movement of the antenna 300 is not end (ACT 11, NO), the process transitions from ACT 11 to ACT 9.

The acquisition unit 1014 repeats the processes of ACT 9 and ACT 10 after the start of the movement of the antenna 300 at the start point until the movement is ended at the end point.

In ACT 9, the acquisition unit 1014 acquires, for each wireless tag 600, a plurality of pieces of tag data detected by the demodulation unit 110 at a plurality of positions of the antenna 300. For example, the acquisition unit 1014 can acquire, for each wireless tag 600, a plurality of pieces of phase data, Doppler frequency data, or RSSI data detected by the demodulation unit 110 at the plurality of positions of the antenna 300.

In ACT 10, for each wireless tag 600, the acquisition unit 1014 stores, in the measurement data storage region 1111, the plurality of pieces of tag data at the plurality of positions of the antenna 300. For example, for each wireless tag 600, the acquisition unit 1014 can store, in the measurement data storage region 1111, the plurality of pieces of phase data, Doppler frequency data, or RSSI data at the plurality of positions of the antenna 300.

The communication control unit 1013 controls end of the radio wave transmission from the antenna 300 (ACT 12). In ACT 12, for example, the communication control unit 1013 controls the end of the radio wave transmission from the antenna 300 based on the end of the movement of the antenna 300. The end of the movement of the antenna 300 is the end of the movement of the antenna 300 from the start point to the end point along the one direction. The antenna 300 ends the radio wave transmission for reading the identification information stored in the wireless tag 600.

The second determination processing unit 1015 selects one determination target wireless tag (ACT 13). In ACT 13, for example, the second determination processing unit 1015 selects, as the determination target wireless tag, one wireless tag 600 from the one or more wireless tags 600 whose tag data set is stored in the measurement data storage region 1111. The second determination processing unit 1015 executes processes of ACT 14 to ACT 16 on the wireless tag 600 selected as the determination target t wireless tag. The second determination processing unit 1015 determines, by the processes of ACT 14 and ACT 15, the positional relationship of the wireless tag 600 with respect to the first range based on the plurality of pieces of tag data related to the wireless tag 600 selected as the determination target wireless tag.

The second determination processing unit 1015 inputs the determination input data to the trained model selected from the plurality of trained models corresponding to the arrangement of the measurement target with respect to the first range (ACT 14). In ACT 14, for example, the second determination processing unit 1015 acquires, based on the measurement data stored in the measurement data storage region 1111, the determination input data for the wireless tag 600 selected as the determination target wireless tag. The second determination processing unit 1015 inputs the acquired determination input data to the trained model.

The second determination processing unit 1015 acquires, based on the input of the determination input data to the trained model, the determination output data output from the trained model (ACT 15). The acquisition of the determination output data is an example of determining the positional relationship of the wireless tag 600 with respect to the first range based on the determination output data. The determination of the positional relationship of the wireless tag 600 with respect to the first range based on the determination output data is an example of determining the positional relationship of the wireless tag 600 with respect to the first range based on the plurality of pieces of tag data on the wireless tag 600.

The output unit 1017 outputs, to the terminal 400 via the second connection interface 105, a determination result for the wireless tag 600 (ACT 16). The output unit 1017 outputs, to the terminal 400 via the second connection interface 105, the identification information stored in the wireless tag 600 read by the reading apparatus 100. The determination result is associated with the identification information.

The terminal 400 may change whether to treat the article 500 attached with the wireless tag 600 as a processing target according to the determination result for the wireless tag 600. If the second determination processing unit 1015 determines that the wireless tag 600 is within the first range, the terminal 400 treats the article 500 attached with the wireless tag 600 as the processing target. Treating the article 500 attached with the wireless tag 600 as the processing target includes treating the wireless tag 600 or the identification information stored in the wireless tag 600 as the processing target. If the second determination processing unit 1015 determines that the wireless tag 600 is within the second range, the terminal 400 does not treat the article 500 attached with the wireless tag 600 as the processing target. Not treating the article 500 attached with the wireless tag 600 as the processing target includes not treating the wireless tag 600 or the identification information stored in the wireless tag 600 as the processing target.

The second determination processing unit 1015 determines whether all the wireless tags 600 are selected as the determination target wireless tag (ACT 17). In ACT 17, for example, the second determination processing unit 1015 determines whether all the wireless tags 600 whose tag data set is stored in the measurement data storage region 1111 are selected.

If the second determination processing unit 1015 selects all the wireless tags 600 as the determination target wireless tag (ACT 17, YES), the process ends. If the second determination processing unit 1015 does not select all the wireless tags 600 as the determination target wireless tag (ACT 17, NO), the process transitions from ACT 17 to ACT 13.

Thus, the reading apparatus 100 can determine that all the wireless tags 600 attached to one or more articles 500 required to be treated as the processing target in the communication system 1 are within the first range. The reading apparatus 100 can determine that the wireless tag 600 attached to the article 500, which is present in the second range and that is not required to be treated as the processing target in the communication system 1, is within the second range.

A plurality of pieces of phase data on the wireless tag 600 corresponding to the position of the wireless tag 600 will be described.

Figure 9:
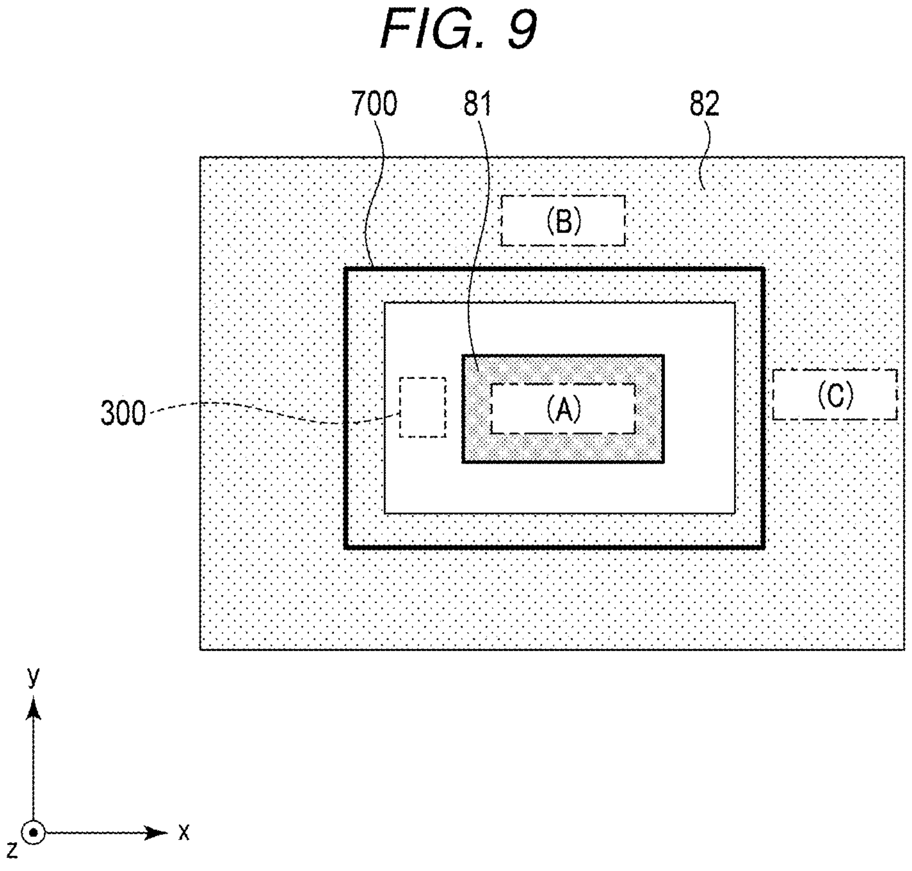
FIG. 9 illustrates a position of a wireless tag.

FIG. 9 illustrates the position of the wireless tag 600.

An area (A) is within the first range 81. In the area (A), five wireless tags 600 are arranged at different positions along the x-axis. An area (B) is within the second range 82. The area (B) faces the area (A) along a y-axis. In the area (B), five wireless tags 600 are arranged at different positions along the x-axis. An area (C) is within the second range 82. The area (C) faces the area (A) along the x-axis. In the area (C), five wireless tags 600 are arranged at different positions along the x-axis.

Figure 10:
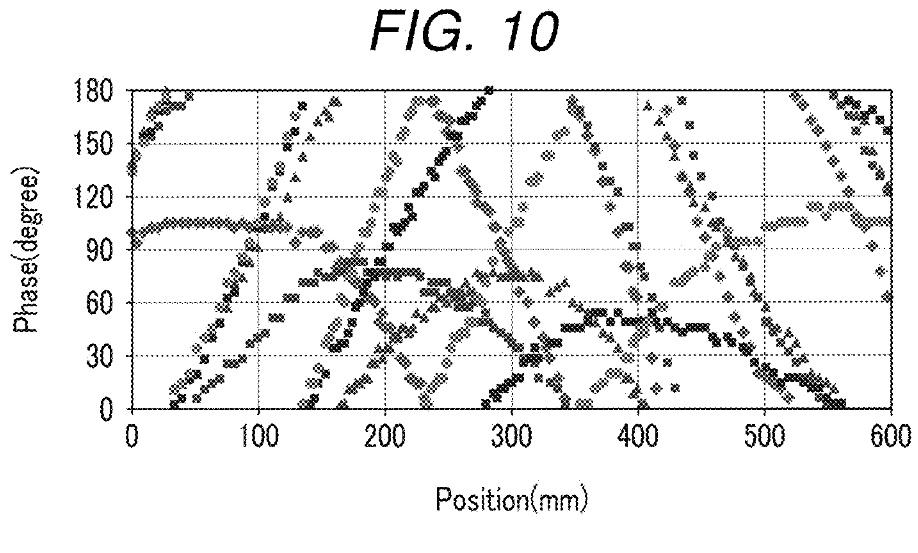
FIG. 10 illustrates an example of a plurality of pieces of phase data on the wireless tag placed in the first range.

FIG. 10 illustrates an example of a plurality of pieces of phase data on the five wireless tags 600 placed in the area (A) within the first range 81.

A horizontal axis indicates the position of the antenna 300 along the x-axis. A vertical axis indicates the phase value. A graph indicates a plurality of phase values between the first point (0 mm) and the second point (600 mm) for each of the five wireless tags 600. Focusing on any one wireless tag 600 among the five wireless tags 600 placed in the area (A), the phase value changes as the position of the antenna 300 changes. Focusing on any position, even though the antenna 300 is at the same position, phase values related to the five wireless tags 600 placed in the area (A) are different.

Figure 11:
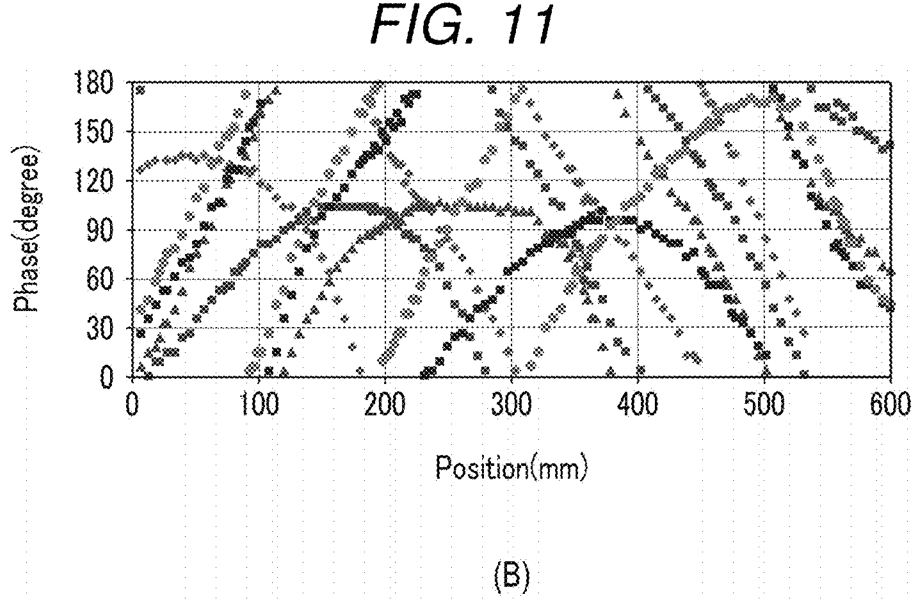
FIG. 11 illustrates an example of a plurality of pieces of phase data on the wireless tag placed in the second range.

FIG. 11 illustrates an example of a plurality of pieces of phase data on the wireless tags 600 placed in the area (B) within the second range 82.

A horizontal axis indicates the position of the antenna 300 along the x-axis. A vertical axis indicates the phase value. A graph indicates a plurality of phase values between the first point (0 mm) and the second point (600 mm) for each of the five wireless tags 600. Focusing on any one wireless tag 600 among the five wireless tags 600 placed in the area (B), the phase value changes as the position of the antenna 300 changes. Focusing on any position, even though the antenna 300 is at the same position, the phase values related to the five wireless tags 600 placed in the area (B) are different.

Figure 12:
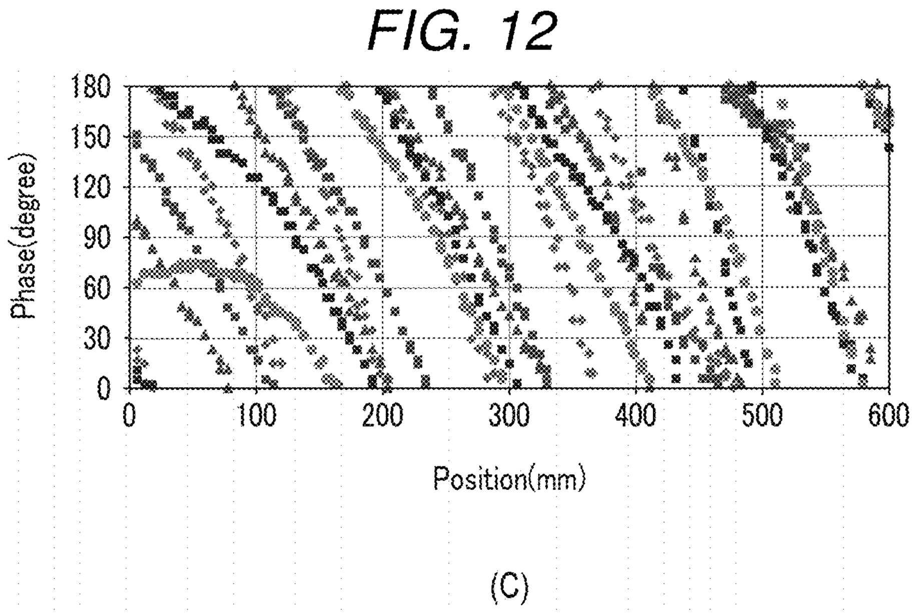
FIG. 12 illustrates another example of the plurality of pieces of phase data on the wireless tag placed in the second range.

FIG. 12 illustrates another example of the plurality of pieces of phase data on the wireless tags 600 placed in the area (C) within the second range 82.

A horizontal axis indicates the position of the antenna 300 along the x-axis. A vertical axis indicates the phase value. A graph indicates a plurality of phase values between the first point (0 mm) and the second point (600 mm) for each of the five wireless tags 600. Focusing on any one wireless tag 600 among the five wireless tags 600 placed in the area (C), the phase value changes as the position of the antenna 300 changes. Focusing on any position, even though the antenna 300 is at the same position, the phase values related to the five wireless tags 600 placed in the area (C) are different.

As illustrated in FIGS. 10 to 12, distribution of the plurality of pieces of phase data on the wireless tags 600 differs within the first range 81 and within the second range 82. The distribution of the plurality of pieces of phase data on the wireless tags 600 differs depending on the positions of the wireless tags 600 even within the first range 81. The distribution of the plurality of pieces of phase data on the wireless tags 600 differs depending on the positions of the wireless tags 600 even within the second range 82.

Figures 13, 14:
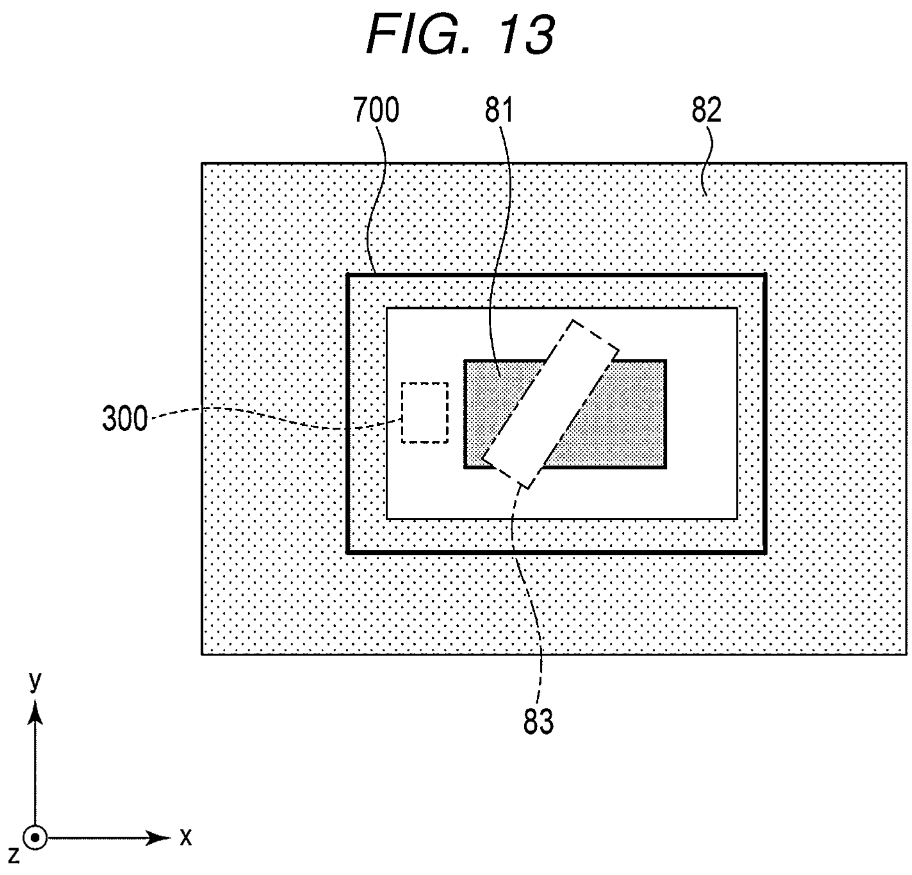
FIG. 13 illustrates an example of an arrangement of a measurement target with respect to the first range.
FIG. 14 illustrates a flowchart of an example of a trained model generation process performed by the processor of the reading apparatus.

FIG. 13 illustrates an example of an arrangement of a measurement target 83 with respect to the first range 81.

Here, it is assumed that a part of the measurement target 83 protrudes from the first range 81 along the y-axis. If the measurement target 83 protrudes from the first range 81, the wireless tag 600 included in the measurement target 83 may also protrude from the first range 81. Here, it is assumed that the wireless tag 600 included in the measurement target 83 protrudes from the first range 81 along the y-axis. The distribution of the plurality of pieces of phase data on the wireless tag 600 protruding from the first range 81 may be more similar to the distribution in the second range 82 illustrated in FIG. 11 than the distribution in the first range 81 illustrated in FIG. 10.

Here, as a comparative example, the second determination processing unit 1015 uses a trained model based on training data in which the training target is within the first range 81. In this case, the second determination processing unit 1015 may determine that the wireless tag 600 protruding from the first range 81 is within the second range 82. In order to avoid such determination, the second determination processing unit 1015 selects the trained model based on the arrangement of the measurement target 83 with respect to the first range 81. For example, the second determination processing unit 1015 selects the trained model corresponding to the arrangement of the training target with respect to the first range 81 most similar to the arrangement of the measurement target 83 with respect to the first range 81. In this case, the second determination processing unit 1015 can determine that the wireless tag 600 is within the first range 81 for the wireless tag 600 included in the measurement target 83 protruding from the first range 81. Therefore, among one or more wireless tags 600 included in the measurement target 83, the wireless tag 600 that is not actually within the first range 81 is still regarded as being in the first range 81.

A trained model generation process performed by the processor 101 of the reading apparatus 100 will be described. The trained model generation process is a process of generating the trained model. Here, a generation example of any one of the plurality of trained models will be described, and the same applies to generation examples of other trained models.

FIG. 14 illustrates a flowchart of an example of the trained model generation process performed by the processor 101 of the reading apparatus 100.

The model processing unit 1018 may start the trained model generation process at any timing to newly create the trained model. The model processing unit 1018 may start the trained model generation process at any timing to update the trained model.

The model processing unit 1018 acquires the training data (ACT 21). In ACT 21, for example, the model processing unit 1018 acquires the training data from the training data storage region 1112.

The model processing unit 1018 generates the trained model by machine learning based on the training data (ACT 22). In ACT 22, for example, the model processing unit 1018 learns the training data by machine learning. The model processing unit 1018 estimates a relationship between a plurality of pieces of training tag data on the training wireless tag at a plurality of positions of the antenna and the ground truth data indicating the positional relationship of the training wireless tag with respect to the first range. The model processing unit 1018 generates the trained model based on the estimation. The machine learning is, but is not limited to, a neural network.

A plurality of pieces of training phase data change according to a distance between the antenna and the training wireless tag. Distribution of the plurality of pieces of training phase data differs depending on a position of the training wireless tag. There is a possibility of a certain correlation between the plurality of pieces of training phase data at the plurality of positions of the antenna and the position of the training wireless tag. A plurality of pieces of training Doppler frequency data differ between a case where the antenna approaches the training wireless tag and a case where the antenna is away from the training wireless tag. Distribution of the plurality of pieces of training Doppler frequency data differs depending on the position of the training wireless tag. There is a possibility of a certain correlation between the plurality of pieces of training Doppler frequency data at the plurality of positions of the antenna and the position of the training wireless tag. A plurality of pieces of training RSSI data change according to the distance between the antenna and the training wireless tag. Distribution of the plurality of pieces of training RSSI data differs depending on the position of the training wireless tag. There is a possibility of a certain correlation between the plurality of pieces of training RSSI data at the plurality of positions of the antenna and the position of the training wireless tag. Thus, there is a possibility of a certain correlation between the plurality of pieces of training tag data at the plurality of positions of the antenna and the position of the training wireless tag.

The model processing unit 1018 stores the generated trained model in the trained model storage region 1113 (ACT 23).

The generation of the trained model may be implemented by an apparatus other than the reading apparatus 100.

Modifications

A modification of the communication system 1 will be described.

Figure 15:
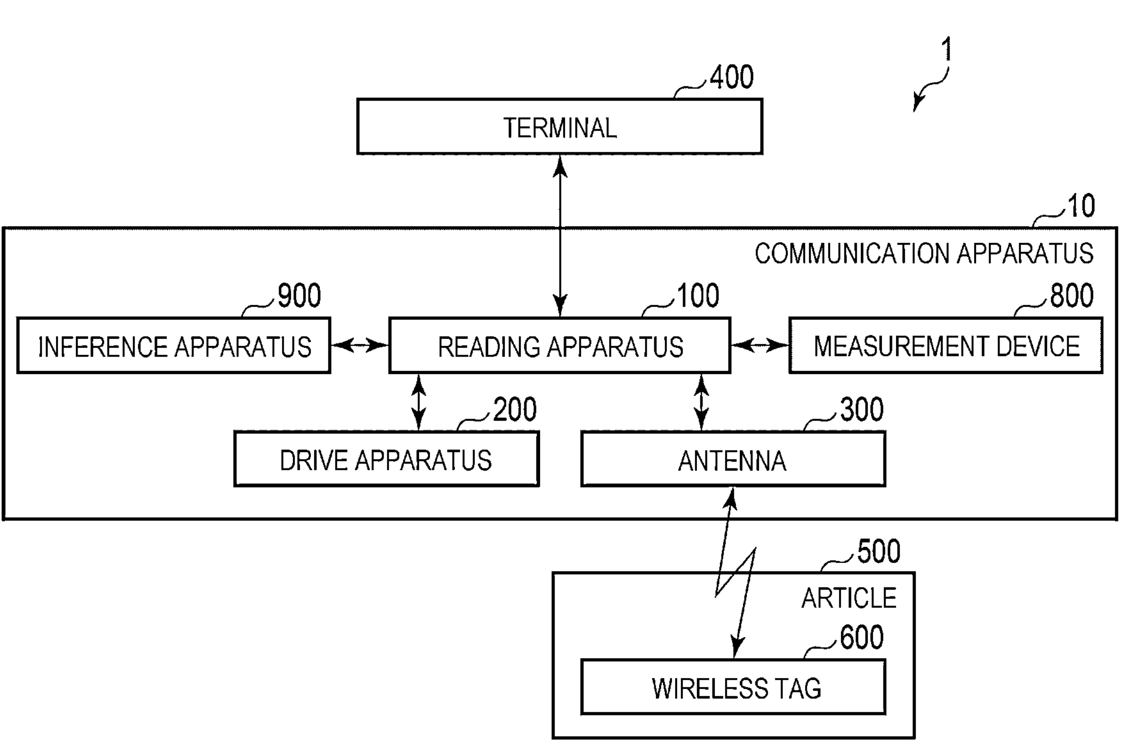
FIG. 15 illustrates a block diagram of a modification of the communication system.

FIG. 15 illustrates a block diagram of the modification of the communication system 1.

In this modification, the communication apparatus 10 includes an inference apparatus 900. The inference apparatus 900 is an apparatus that can execute processing related to the trained model. The reading apparatus 100 includes a third connection interface for the reading apparatus 100 to communicate with the inference apparatus 900.

Figure 16:
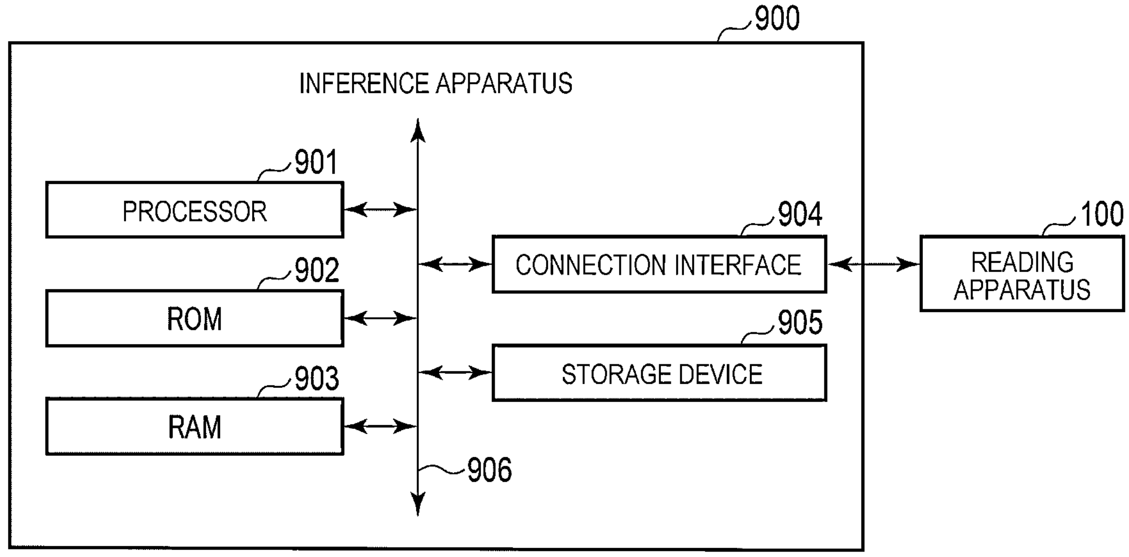
FIG. 16 illustrates a block diagram of an example of a configuration of an inference apparatus.

FIG. 16 illustrates a block diagram of an example of a configuration of the inference apparatus 900.

The inference apparatus 900 includes a processor 901, a ROM 902, a RAM 903, a connection interface 904, and a storage device 905. The units provided in the inference apparatus 900 are connected by a bus 906 or the like. A configuration of the processor 901 may be the same as the configuration of the processor 101. A configuration of the ROM 902 may be the same as the configuration of the ROM 102. A configuration of the RAM 903 may be the same as the configuration of the RAM 103. The connection interface 904 is an interface for the inference apparatus 900 to communicate with the reading apparatus 100. A configuration of the storage device 905 may be the same as the configuration of the storage device 111.

The storage device 905 stores a plurality of different pieces of training data corresponding to the arrangement of the training target with respect to the above-described first range. The storage device 905 stores a plurality of different trained models corresponding to the arrangement of the training target with respect to the above-described first range. The plurality of trained models are associated with information indicating the arrangement of the training target with respect to the first range.

The processor 901 selects, based on the arrangement of the measurement target with respect to the first range determined by the first determination processing unit 1011 of the reading apparatus 100, one trained model from the plurality of trained models. The processor 901 inputs the determination input data for each wireless tag 600 to the trained model selected from the plurality of trained models according to the arrangement of the measurement target with respect to the first range. The processor 901 acquires the determination output data output from the trained model based on the input of the determination input data to the trained model for each wireless tag 600. The processor 901 generates the trained model by machine learning based on the training data.

An operation example of the reading apparatus 100 and the inference apparatus 900 in the modification will be described.

The second determination processing unit 1015 of the reading apparatus 100 transmits, to the inference apparatus 900 via the third connection interface, information indicating the arrangement of the measurement target with respect to the first range determined by the first determination processing unit 1011. The processor 901 of the inference apparatus 900 selects one trained model from the plurality of trained models based on the arrangement of the measurement target with respect to the first range. The trained model selection process performed by the processor 901 may be the same as the trained model selection process performed by the second determination processing unit 1015 described above.

The second determination processing unit 1015 of the reading apparatus 100 transmits, via the third connection interface to the inference apparatus 900, the tag data set for each wireless tag 600. The processor 901 of the inference apparatus 900 receives, via the connection interface 904 from the reading apparatus 100, the tag data set for each wireless tag 600. The processor 901 inputs, based on the tag data set for each wireless tag 600, the determination input data to the trained model selected according to the arrangement of the measurement target with respect to the first range. The processor 901 acquires the determination output data output from the trained model based on the input of the determination input data to the trained model for each wireless tag 600. The processor 901 transmits, via the third connection interface to the reading apparatus 100, the determination output data for each wireless tag 600. The second determination processing unit 1015 of the reading apparatus 100 receives, via the third connection interface from the inference apparatus 900, the determination output data for each wireless tag 600. Receiving the determination output data is an example of acquiring the determination output data.

Effects

The communication apparatus 10 determines the arrangement of the measurement target with respect to the first range based on the measurement of the measurement target including the one or more wireless tags 600 by the measurement device 800. The communication apparatus 10 determines the positional relationship of the wireless tag 600 with respect to the first range using the trained model selected according to the arrangement of the measurement target with respect to the first range.

If the measurement target protrudes from the first range, the wireless tag 600 included in the measurement target may also protrude from the first range. The distribution of the plurality of pieces of phase data on the wireless tag 600 protruding from the first range may be more similar to the distribution in the second range than the distribution in the first range. If the wireless tag 600 that is originally to be placed within the first range protrudes from the first range, the communication apparatus 10 can determine that the wireless tag 600 is within the first range. Therefore, the communication apparatus 10 can avoid determining that the wireless tag 600 is within the second range. Accordingly, the communication apparatus 10 can improve the determination accuracy of the positional relationship of the wireless tag 600 with respect to the first range.

The plurality of trained models are a plurality of different models according to the arrangement of the training target with respect to the first range.

The communication apparatus 10 can select the trained model according to the arrangement of the training target with respect to the first range, which corresponds to the arrangement of the measurement target with respect to the first range. The communication apparatus 10 can determine that the wireless tags 600 are within the first range for the one or more wireless tags 600 included in the measurement target.

The plurality of pieces of training data include a plurality of pieces of ground truth data. The plurality of pieces of ground truth data include ground truth data indicating that the one or more training target wireless tags included in the training target are within the first range regardless of whether the training target is within the first range.

The plurality of trained models can be determined to be within the first range for the one or more wireless tags 600 included in the measurement target regardless of the arrangement of the measurement target with respect to the first range.

The measurement target is the article 500 attached with the one or more wireless tags 600.

The user may place the article 500 directly on the counter table 700 on which the first range is set. In such a case, the communication apparatus 10 can still select the trained model corresponding to the arrangement of the article with respect to the first range.

The measurement target is a container containing the article 500 attached with the one or more wireless tags 600.

The user may place the container containing the article 500 on the counter table 700 on which the first range is set. In such a case, the communication apparatus 10 can still select the trained model corresponding to an arrangement of the container with respect to the first range.

APPENDIX

The embodiment can be expressed as follows.

(1) A communication apparatus including:

a first determination processing unit configured to determine, based on measurement of a target including one or more wireless tags by a measurement unit, an arrangement of the target with respect to a predetermined range;

a movement control unit configured to control movement of a relative position of an antenna with respect to the target;

an acquisition unit configured to acquire, based on a radio wave of each of the wireless tags received by the antenna, a plurality of pieces of tag data on the wireless tag at a plurality of relative positions of the antenna; and a second determination processing unit configured to determine, based on data output from a trained model in response to input of the plurality of pieces of tag data on the wireless tag to the trained model, a positional relationship of the wireless tag with respect to the predetermined range, the trained model being selected from a plurality of trained models according to the arrangement of the target.

(2) The communication apparatus according to (1), in which the plurality of trained models are a plurality of different models corresponding to an arrangement of a training target including one or more training wireless tags with respect to the predetermined range.

(3) The communication apparatus according to (2), in which the plurality of trained models are models generated by machine learning based on a plurality of pieces of training data, the plurality of pieces of training data include: a plurality of pieces of tag data on a plurality of training wireless tags including the one or more training wireless tags; and a plurality of pieces of data indicating a positional relationship of the plurality of training wireless tags with respect to the predetermined range, and the plurality of pieces of data indicating the positional relationship of the plurality of training wireless tags with respect to the predetermined range include data indicating that the one or more training wireless tags are within the predetermined range regardless of whether the training target is within the predetermined range.

(4) The communication apparatus according to any one of (1) to (3), in which the predetermined range faces a part or all of a movement range of the relative position of the antenna.

(5) The communication apparatus according to any one of (1) to (4), in which the target is an article attached with the one or more wireless tags.

(6) The communication apparatus according to any one of (1) to (4), in which the target is a container containing an article attached with the one or more wireless tags.

(7) A communication method including:

determining, based on measurement of a target including one or more wireless tags by a measurement unit, an arrangement of the target with respect to a predetermined range;

controlling movement of a relative position of an antenna with respect to the target;

acquiring, based on a radio wave of each of the wireless tags received by the antenna, a plurality of pieces of tag data on the wireless tag at a plurality of relative positions of the antenna; and determining, based on data output from a trained model in response to input of the plurality of pieces of tag data on the wireless tag to the trained model, a positional relationship of the wireless tag with respect to the predetermined range, the trained model being selected from a plurality of trained models according to the arrangement of the target.

Other Embodiments

In the above-described embodiment, an example in which the drive apparatus 200 moves the antenna 300 is described, but the configuration is not limited thereto. The position of the antenna 300 may be fixed, and the drive apparatus 200 may be an apparatus that moves the wireless tag 600. In this example, the drive apparatus 200 may move a stage on which the wireless tag 600 is placed. The stage on which the wireless tag 600 is placed is not limited to a stage that moves in one direction. The stage on which the wireless tag 600 is placed may be a stage having various moving modes such as a rotating stage. Moving the wireless tag 600 is an example of moving the relative position of the antenna 300 with respect to the wireless tag 600. The position of the antenna 300 is an example of the relative position of the antenna 300 with respect to the wireless tag 600. The drive apparatus 200 may be an apparatus that moves both the antenna 300 and the wireless tag 600. Moving both the antenna 300 and the wireless tag 600 is an example of moving the relative position of the antenna 300 with respect to the wireless tag 600. The position of the antenna 300 is an example of the relative position of the antenna 300 with respect to the wireless tag 600.

The communication apparatus may be implemented by a plurality of apparatuses as described in the above example or may be implemented by a single apparatus in which functions of a plurality of apparatuses are integrated. The reading apparatus, the drive apparatus, the antenna, and the measurement device may be implemented by a single apparatus in which functions are integrated. The reading apparatus may be implemented by a plurality of apparatuses with distributed functions.

The above-described embodiment may be applied to not only an apparatus but also a method executed by an apparatus. The above-described embodiment may be applied to a program enabling a computer of an apparatus to execute each function. The above-described embodiment may be applied to a recording medium that stores the program.

The program may be transferred in a state of being stored in an apparatus or may be transferred in a state of not being stored in the apparatus. In the latter case, the program may be transferred via a network or may be transferred in a state of being recorded on a recording medium. The recording medium is a non-transitory tangible medium. The recording medium is a computer-readable medium. A form of the recording medium is not limited as long as the recording medium is a medium that can store the program and can be read by a computer, such as a CD-ROM or a memory card.

Although some embodiments of the disclosure have been described, these embodiments are presented as examples and are not intended to limit the scope of the disclosure. These novel embodiments can be implemented in various other forms, and various omissions, substitutions, and modifications can be made without departing from the gist of the disclosure. These embodiments and modifications thereof are included in the scope and gist of the disclosure, as well as in those recited in the claims and an equivalent scope thereof.

What is claimed is:

1. A communication apparatus, comprising:

a first determination processing component configured to determine, based on measurement of a target including one or more wireless tags by a measurement component, an arrangement of the target with respect to a predetermined range;

a movement controller configured to control movement of a relative position of an antenna with respect to the target;

an acquisition component configured to acquire, based on a radio wave of each of the wireless tags received by the antenna, a plurality of pieces of tag data on the wireless tag at a plurality of relative positions of the antenna; and a second determination processing component configured to:

based on the arrangement of the target, select a trained model from a plurality of trained models; and determine, based on data output from the trained model in response to input of the plurality of pieces of tag data on the wireless tag to the trained model, a positional relationship of the wireless tag with respect to the predetermined range.

2. The communication apparatus according to claim 1, wherein the plurality of trained models comprise a plurality of different models corresponding to an arrangement of a training target including one or more training wireless tags with respect to the predetermined range.

3. The communication apparatus according to claim 2, wherein the plurality of trained models comprise models generated by machine learning based on a plurality of pieces of training data, the plurality of pieces of training data include: a plurality of pieces of tag data on a plurality of training wireless tags including the one or more training wireless tags; and a plurality of pieces of data indicating a positional relationship of the plurality of training wireless tags with respect to the predetermined range, and the plurality of pieces of data indicating the positional relationship of the plurality of training wireless tags with respect to the predetermined range include data indicating that the one or more training wireless tags are within the predetermined range regardless of whether the training target is within the predetermined range.

4. The communication apparatus according to claim 1, wherein the predetermined range faces a part or all of a movement range of the relative position of the antenna.

5. The communication apparatus according to claim 1, wherein the target is an article attached with the one or more wireless tags or a container containing the article.

6. The communication apparatus according to claim 1, wherein the tag data comprises at least one of phase data, Doppler frequency data, and received signal strength indicator data.

7. The communication apparatus according to claim 6, wherein the phase data is data indicating a phase of a radio wave of the wireless tag received by a reading apparatus.

8. The communication apparatus according to claim 6, wherein the Doppler frequency data is data indicating a frequency of a radio wave of the wireless tag received by a reading apparatus.

9. The communication apparatus according to claim 6, wherein the received signal strength indicator data is data indicating a received signal strength indicator of a radio wave of the wireless tag received by a reading apparatus.

10. The communication apparatus according to claim 1, wherein the trained model comprises training data including a plurality of pieces of ground truth data.

11. A communication method, comprising:

determining, based on measurement of a target including one or more wireless tags by a measurement component, an arrangement of the target with respect to a predetermined range;

controlling movement of a relative position of an antenna with respect to the target;

acquiring, based on a radio wave of each of the wireless tags received by the antenna, a plurality of pieces of tag data on the wireless tag at a plurality of relative positions of the antenna;

selecting, based on the arrangement of the target, a trained model from a plurality of trained models; and determining, based on data output from the trained model in response to input of the plurality of pieces of tag data on the wireless tag to the trained model, a positional relationship of the wireless tag with respect to the predetermined range.

12. The communication method according to claim 11, wherein the plurality of trained models comprise a plurality of different models corresponding to an arrangement of a training target including one or more training wireless tags with respect to the predetermined range.

13. The communication method according to claim 12, wherein the plurality of trained models comprise models generated by machine learning based on a plurality of pieces of training data, the plurality of pieces of training data include: a plurality of pieces of tag data on a plurality of training wireless tags including the one or more training wireless tags; and a plurality of pieces of data indicating a positional relationship of the plurality of training wireless tags with respect to the predetermined range, and the plurality of pieces of data indicating the positional relationship of the plurality of training wireless tags with respect to the predetermined range include data indicating that the one or more training wireless tags are within the predetermined range regardless of whether the training target is within the predetermined range.

14. The communication method according to claim 11, wherein the predetermined range faces a part or all of a movement range of the relative position of the antenna.

15. The communication method according to claim 11, wherein the target is an article attached with the one or more wireless tags or a container containing the article.

16. The communication method according to claim 11, wherein the tag data comprises at least one of phase data, Doppler frequency data, and received signal strength indicator data.

17. The communication method according to claim 16, wherein the phase data is data indicating a phase of a radio wave of the wireless tag received by a reading apparatus.

18. The communication method according to claim 16, wherein the Doppler frequency data is data indicating a frequency of a radio wave of the wireless tag received by a reading apparatus.

19. The communication method according to claim 16, wherein the received signal strength indicator data is data indicating a received signal strength indicator of a radio wave of the wireless tag received by a reading apparatus.

20. The communication method according to claim 11, wherein the trained model comprises training data including a plurality of pieces of ground truth data.

* * * * *